United States Patent [19]

Enomoto et al.

[11] Patent Number: 5,719,947
[45] Date of Patent: Feb. 17, 1998

[54] DYNAMIC IMAGE PROCESSOR

[75] Inventors: Hajime Enomoto, Kawasaki; Isao Miyamura, Niigata, both of Japan

[73] Assignee: Fujitsu Limited, Kawasaki, Japan

[21] Appl. No.: 202,004

[22] Filed: Feb. 25, 1994

[30] Foreign Application Priority Data

Feb. 26, 1993 [JP] Japan .................................. 5-038358
Dec. 7, 1993 [JP] Japan .................................. 5-306200

[51] Int. Cl.$^6$ .................................................. G06R 9/00
[52] U.S. Cl. ........................ 382/107; 382/236; 382/293
[58] Field of Search .................................. 382/295, 296, 382/298, 293, 294, 300, 276, 285, 286, 289, 291, 236, 103, 105, 107; 348/155, 169

[56] References Cited

FOREIGN PATENT DOCUMENTS

| 63-299594 | 12/1988 | Japan . |
| 1-213761 | 8/1989 | Japan . |
| 2-208781 | 8/1990 | Japan . |
| 3-267879 | 11/1991 | Japan . |
| 4-287180 | 10/1992 | Japan . |
| 5-233690 | 3/1993 | Japan . |

OTHER PUBLICATIONS

Yamato et al. "Direct Estimation of Range Flow on Deformable Shape from a Video Rate Range Camera", IEEE Transactions on Pattern Analysis and Machine Intelligence, vol. 15, No. 1, Jan. 1993.

Primary Examiner—Joseph Mancuso
Attorney, Agent, or Firm—Staas & Halsey

[57] ABSTRACT

A dynamic image processor for temporally analyzing the motion of each individual object contained in a dynamic image includes a rigid motion velocity vector extract unit for providing velocity vector data for rigid motion of the individual object; and a soft deformable motion velocity vector extract unit for providing velocity vector data for soft deformable motion after subtracting the rigid motion components. To plot the dynamic image, there are arranged a rigid motion velocity vector plot unit employing velocity vector data for the rigid motion of the individual object; and a soft deformable motion velocity vector plot unit employing velocity vector data for the soft deformable motion after subtracting the rigid motion components.

20 Claims, 19 Drawing Sheets

DIRECTION OF LINE OF SIGHT
(DIRECTION OF LIGHT SOURCE)

DIRECTION OF LIGHT SOURCE

DIRECTION OF LINE OF SIGHT

IN-PLANE AXIS

DYNAMIC IMAGE PROCESSOR

BACKGROUND OF THE INVENTION

1. Field of the Invention

The present invention relates to a dynamic image processor for temporally analyzing the motion of each individual object contained in a given dynamic image, extracting motional data for the individual object, storing the data, and/or plotting the motion of the individual object in the dynamic image according to the stored motional data.

2. Description of the Related Art

A color image plotted on an x-y plane may be processed in a three-dimensional vector field with use of an axis z orthogonal to the x-y plane. This technique is disclosed in Japanese Unexamined Patent Publication (Kokai) Nos. 63-299594, 1-213761, 2-208781, 3-267879, and 4-287180. These disclosures extract an edge (including a position where chromaticity changes) out of a color image according to facts that, when the color image is a still image (i.e., a static image), divergence and rotation processes carried out on color image signals provide substantially a value of zero, and that these processes provide large values at positions where the chromaticity of the image suddenly changes.

To detect the motion of a dynamic image, a prior art selects an objective point on each individual object in the image, finds points correlated to the objective point according to the positions of the point at different timings, and calculates motional vectors according to distance vectors for the correlated points.

The dynamic image processing according to the prior art involves complicated steps to find the correlated points. Further, it is often troublesome to adequately extract fundamental parameters which are necessary for expressing the motion of the dynamic image. Namely, since too many correlated points must be found on each individual object in a dynamic image, the prior art involves a large number of processes, in order to detect the motion of the dynamic image.

SUMMARY OF THE INVENTION

In view of the above-described problems existing in the prior art, the main object of the present invention is to provide a dynamic image processor, which allows the motion of the individual object in a dynamic image to be easily grasped by dividing the motion into rigid motion and non-rigid deformable motion. Hereinafter, such a non-rigid deformable motion is referred to as a soft deformable motion.

A further object of the present invention is to provide a dynamic image processor, which allows motional velocity vectors that are fundamental parameters with regard to the individual object to be easily grasped, and allows the dynamic image to be adequately plotted in accordance with these motional velocity vectors.

A still further object of the present invention is to provide a dynamic image processor, which can deal with the rotational motion of the individual object around an in-plane axis.

To attain these objects, the dynamic image processor according to the present invention, which is provided for temporally analyzing the motion of each individual object contained in a given dynamic image, extracting motional data for the individual object, storing the motional data, and/or plotting the motion of the individual object in the dynamic image according to the stored motional data, includes a motional velocity vector extract unit for extracting a velocity vector out of the motion of the individual object. In this case, the unit has:

a rigid motion velocity vector extract unit for providing velocity vector data for the rigid motion of the individual object such as translation, scaling such as enlargement and contraction, and rotation around an in-plane perpendicular axis; and a soft deformable motion velocity vector extract unit (non-rigid deformable motion velocity vector extract unit) for providing velocity vector data for the soft deformable motion of the individual object after subtracting the rigid motion components.

The rigid motion velocity vector extract unit carries out an affine transformation on the individual object, to provide the motional velocity vector data for the translation, scaling, and in-plane perpendicular axis rotation of the individual object.

The soft deformable motion velocity vector extract unit calculates the motion of the individual object after subtracting the rigid motion components according to a vector technique, to provide the soft deformable motion velocity vector data.

The rigid motion velocity vector extract unit preferably provides the motional velocity vector data for the translation, scaling, and in-plane perpendicular axis rotation of the individual object by calculating the effective motional velocity vector (Vi) of each objective point (Pi) on the individual object as a function of a translation velocity vector (Vp), a scaling parameter (s), an angular velocity (ω) of the in-plane perpendicular axis rotation, and a distance vector (γi) between the point (Pi) and a temporary center (C) temporarily set for the scaling and in-plane perpendicular axis rotation;

a velocity component along a line of force and a velocity component along a tangent line are measured at each of at least four points (P1, P2, P3, and P4) corresponding to the objective points (Pi; i=1, 2, 3 and 4) on a segment forming the individual object; and the translation velocity vector (Vp), scaling parameter (s), and angular velocity (ω) of the in-plane perpendicular axis rotation are calculated according to the velocity components along the line of force and tangent line.

Further, the soft deformable motion velocity vector extract unit calculates the motion of the individual object after subtracting the rigid motion components, by vectorially processing a contour line based on the shape of the individual object and/or a structure extended contour line based on changes in luminance and chromaticity, interpolates undetermined points on the contour line and/or structure extended contour line, and finds velocity vectors among the corresponding points.

Preferably, the dynamic image processor according to the present invention includes a motional velocity vector plot unit for plotting the individual object according to a motional velocity vector representing the motion of the individual object.

Preferably, the unit has:

a rigid motion velocity vector plot unit employing velocity vector data for the rigid motion of the individual object such as translation, scaling such as enlargement and contraction, and rotation around an in-plane perpendicular axis; and a soft deformable motion velocity vector plot unit (non-rigid deformable motion velocity vector plot unit) employing velocity vector data for the soft deformable motion of the individual object after subtracting the rigid motion components.

The rigid motion velocity vector plot unit and soft deformable motion velocity vector plot unit repeat the respective process.

The rigid motion velocity vector plot unit preferably plots the rigid motion of the individual object according to a translation velocity vector (Vp), a scaling parameter (s), and an angular velocity (ω) of the in-plane perpendicular axis rotation.

Further, the rigid motion velocity vector plot unit plots the rigid motion of the individual object according to data obtained for each objective point (Pi) at sampling timings.

Further, the rigid motion velocity vector plot unit plots the rigid motion involving in-plane axis rotation of the individual object according to the translation velocity vector (Vp) of each point on the individual object when the vector (Vp) is given in advance.

The rigid motion of an individual object may involve: (i) translation in which the individual object is displaced as a whole with no rotation; (ii) scaling in which the individual object is enlarged or contracted; and (iii) rotation around an axis perpendicular to the plane of the individual object. The parameters are provided for these motions, respectively. If a translation velocity vector is extractable at each coordinate point on the individual object, the motion of the individual object may involve (iv) rigid rotation around an in-plane axis.

The rigid motion velocity vector extract unit carries out an affine transformation to provide translation velocity vector data, scaling velocity vector data, and rotational velocity vector data around the in-plane perpendicular axis. If required, it provides rotational velocity vector data around the in-plane axis according to the three pieces of data mentioned above ((i), (ii), and (iii)).

The soft deformable motion of the individual object is processed after removing the rigid motion components related to the translation, scaling, in-plane perpendicular axis rotation, and if necessary, in-plane axis rotation.

The soft deformable motion is processed by examining correlations among points on edges of temporally different images of the individual object and by extracting motional velocity vectors, similar to the prior art.

The extracted parameters are stored in, for example, a storage unit. The parameters are read out of the storage unit when required and are used to plot the image. The plotting is carried out in two separate steps, i.e., the plotting of the rigid motion and the plotting of the soft deformable motion. This kind of plotting process is carried out by the rigid motion velocity vector plot unit and the soft deformable motion velocity vector plot unit, respectively.

BRIEF DESCRIPTION OF THE DRAWINGS

The above objects and features of the present invention will be more apparent from the following description of the preferred embodiments with reference to the accompanying drawings, wherein:

FIG. 20 is rotated around an in-plane axis;

DESCRIPTION OF THE PREFERRED EMBODIMENTS

Figure 1:
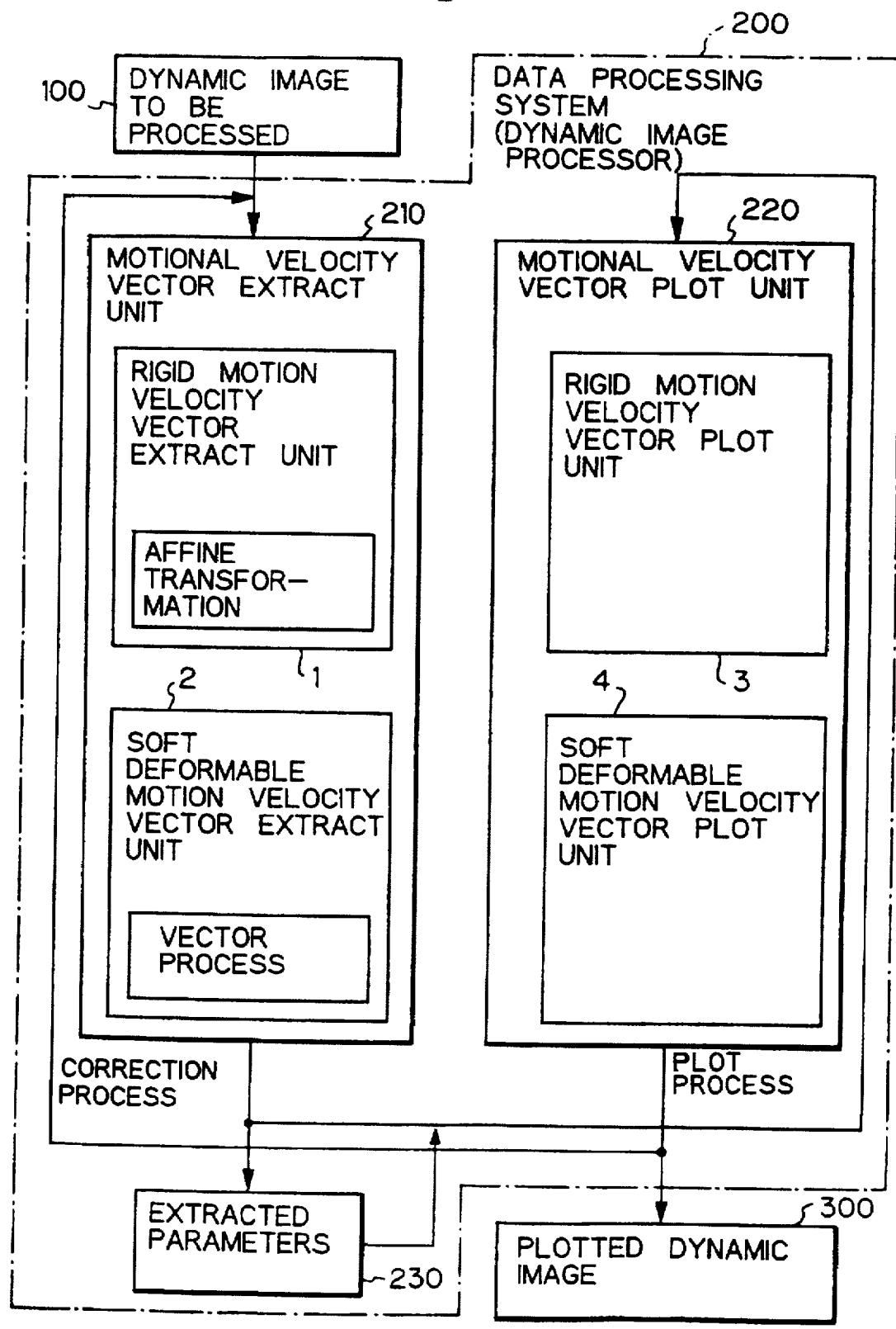
FIG. 1 is a schematic block diagram showing an essential embodiment based on the principle of the present invention.

FIG. 1 is a block diagram showing an essential embodiment of the present invention based on the principle of the present invention. In this case, only the main part of a dynamic image processor and the related images are shown. In the figure, numeral 100 is a dynamic image to be processed, 200 is a dynamic image processor, and 300 is a resultant dynamic image (plotted dynamic image).

The dynamic image processor 200 is realized by a data processing system. The dynamic image processor 200 comprises:

(i) a motional velocity vector extract unit 210 for analyzing the image 100 and extracting parameters;

(ii) a motional velocity vector plot unit 220 for plotting the resultant dynamic image 300 according to the parameters;

and (iii) the extracted parameters 230.

The motional velocity vector extract unit 210 according to the present invention has a rigid motion velocity vector extract unit 1 for extracting a motional velocity vector for the rigid motion of each of individual objects in the dynamic image on an assumption that the individual object is rigid, and a soft deformable motion velocity vector extract unit 2 for extracting a motional velocity vector for the soft deformable motion of the individual object, which cannot be grasped on the assumption that the motion of the individual object is rigid.

The motional velocity vector plot unit 220 has a rigid motion velocity vector plot unit 3 for plotting the rigid motion of the individual object according to the parameters, and a soft deformable motion velocity vector plot unit 4 for plotting the soft deformable motion of the individual object.

The rigid motion of an individual object may involve:

(i) translation in which the individual object is displaced as a whole with no rotation;

(ii) scaling in which the individual object is enlarged or contracted;

and (iii) rotation around an axis (z) perpendicular to the plane of the individual object. The parameters are provided for these motions, respectively. If a translation velocity vector is extractable at each coordinate point on the individual object, the motion of the individual object may involve (iv) rigid rotation around an in-plane axis (an axis in the x-y plane).

The rigid motion velocity vector extract unit 1 in FIG. 1 carries out an affine transformation to provide translation velocity vector data, scaling velocity vector data, and rotational velocity vector data around the in-plane perpendicular axis. If required, it provides rotational velocity vector data around the in-plane axis according to the three pieces of data mentioned above ((i), (ii), and (iii)).

The soft deformable motion of the individual object is processed after removing the rigid motion components related to the translation, scaling, in-plane perpendicular axis rotation, and if necessary, in-plane axis rotation.

The soft deformable motion is processed by examining the correlation among points on edges of temporally different images of the individual object and by extracting motional velocity vectors, similar to the prior art.

The extracted parameters 230 are stored in, for example, a storage unit. The parameters are read out of the storage unit when required, and are used to plot the image. The plotting is carried out in two separate steps, i.e., the plotting of the rigid motion and the plotting of the soft deformable motion. This kind of plotting process is carried out by the rigid motion velocity vector plot unit 3 and soft deformable motion velocity vector plot unit 4 of FIG. 1, respectively. The parameters must be changed unless the resultant dynamic image is satisfactory, by repeating a correction process in the motional velocity vector extract unit 210.

The extracting of parameters corresponding to the rigid motion will be explained at first.

Figure 2:
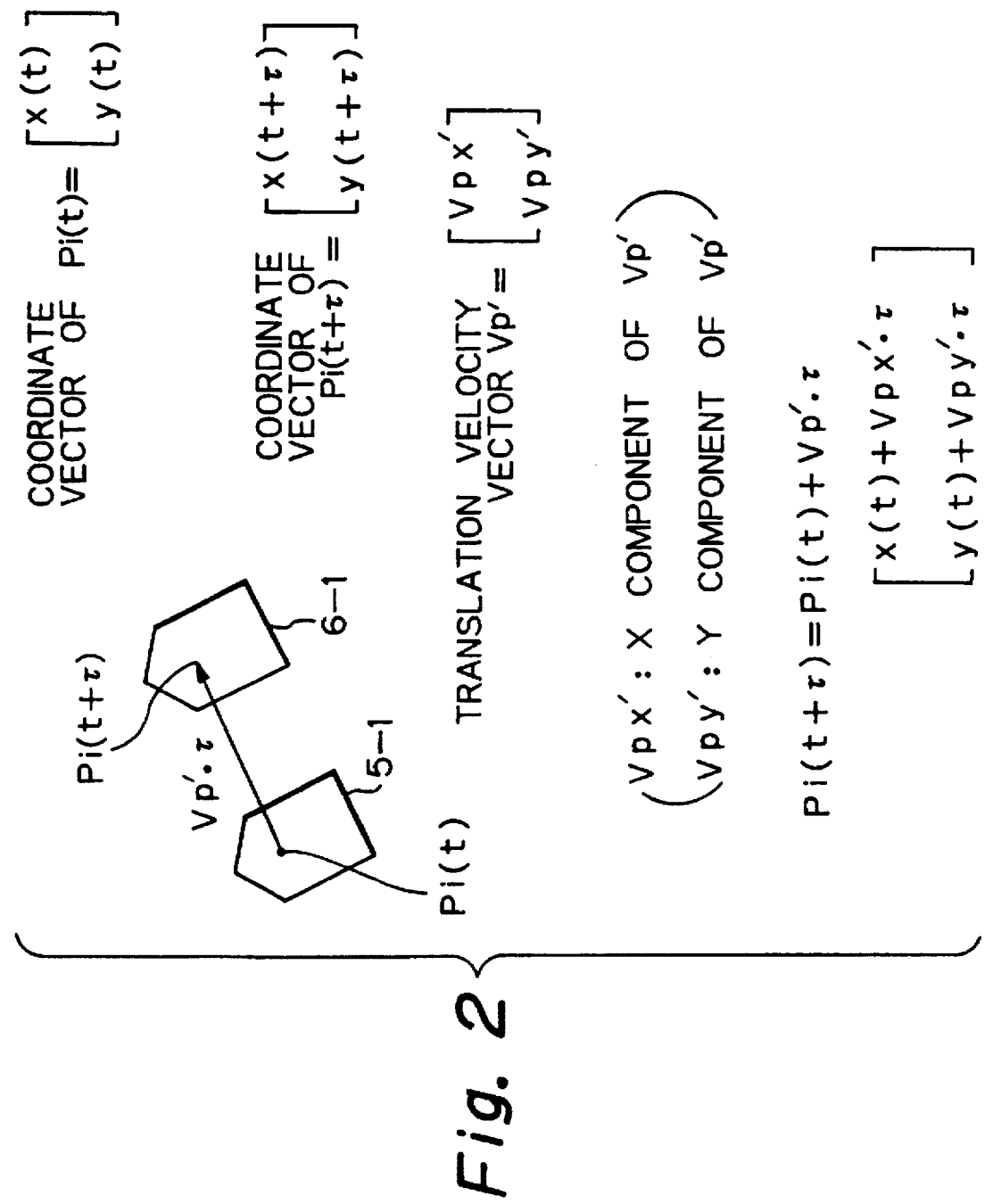
FIG. 2 is a diagram for explaining a technique for extracting parameters for translation according to the present invention.

FIG. 2 explains the extracting of parameters corresponding to translation. In the figure, an individual object 5-1 is translated at a velocity of Vp' to a position where the individual object is indicated as 6-1. The coordinates at time t of an optional point Pi on the individual object 5-1 (hereinafter, this point will be indicated as Pi(t)) are as follows:

$$\text{Coordinate vector of } Pi(t) = \begin{bmatrix} x(t) \\ y(t) \end{bmatrix}$$

The coordinates of the point at time t+τ (hereinafter, this point will be indicated as Pi(t+τ)) are as follows:

$$\text{Coordinate vector of } Pi(t+\tau) = \begin{bmatrix} x(t+\tau) \\ y(t+\tau) \end{bmatrix}$$

The translation velocity vector (hereinafter, Vp' will be defined as a translation velocity vector) is as follows:

$$Vp' = \begin{bmatrix} Vpx' \\ Vpy' \end{bmatrix}$$

The motion of the individual object 5-1 to the position of the individual object 6-1 for the period r is expressed as follows:

$$\begin{aligned} Pi(t+\tau) &= Pi(t) + Vp' \cdot \tau \\ &= \begin{bmatrix} x(t) + Vpx' \cdot \tau \\ y(t) + Vpy' \cdot \tau \end{bmatrix} \end{aligned}$$

Accordingly, the motion from the individual object 5-1 to the individual object 6-1 can be defined and plotted if the translation velocity vector Vp' is given.

Figure 3:
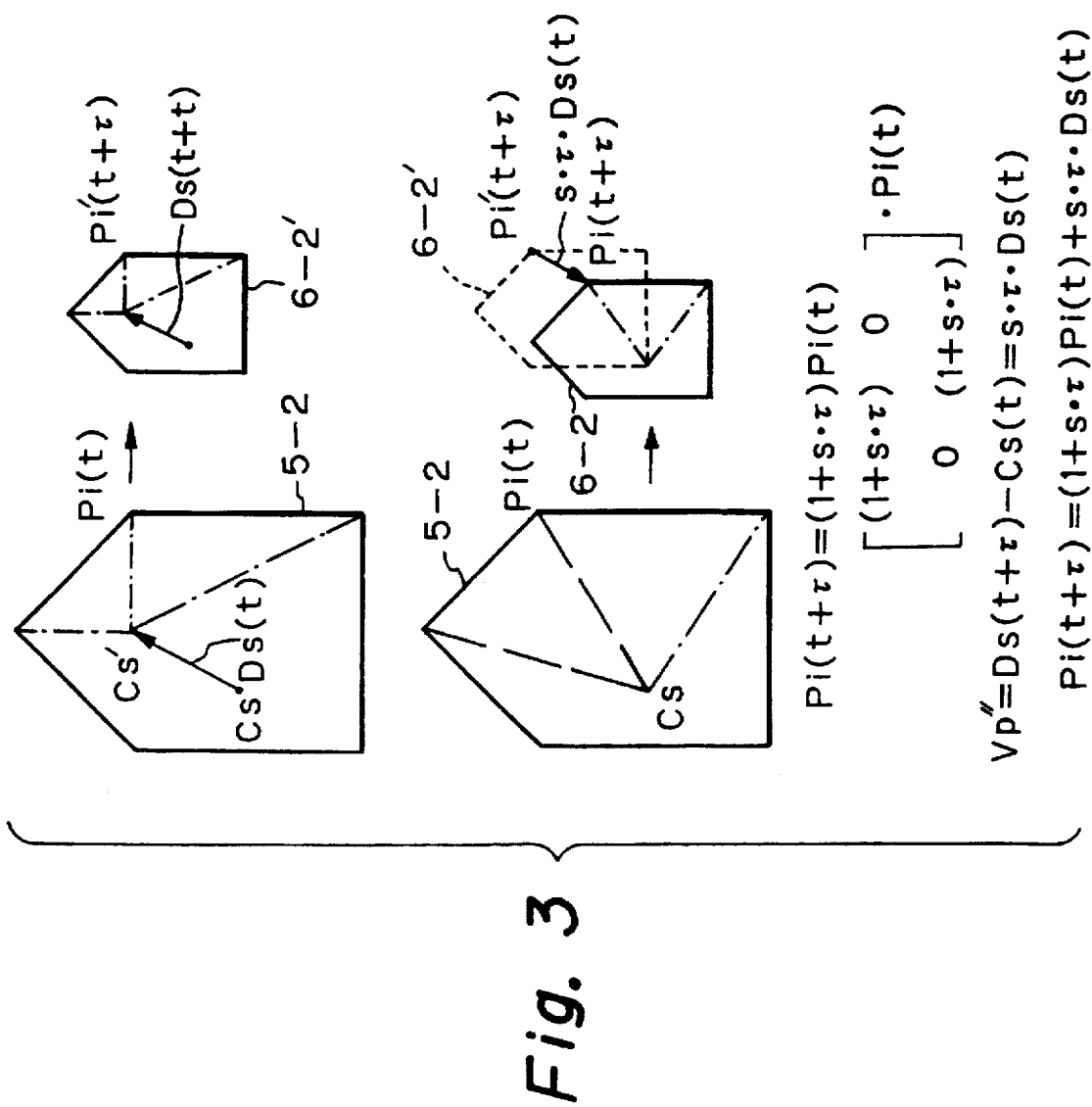
FIG. 3 is a diagram for explaining a technique for extracting parameters for scaling according to the present invention.

FIG. 3 explains the extracting of parameters related to scaling. In the figure, an individual object 5-2 has a scaling center Cs around which the individual object 5-2 is scaled down by ½ times into an individual object 6-2. Generally, the position of the scaling center Cs is not clear in advance. It is, therefore, assumed that the individual object 5-2 is scaled down by ½ times around a temporary scaling center Cs', and then, the difference between the scaling center Cs and the temporary scaling center Cs' is corrected. In the figure, reference numeral 6-2' indicates an individual object resulting from the individual object 5-2 scaled down around the temporary center Cs'.

A point Pi on the individual object 5-2 is shifted to a point on the individual object 6-2' having the temporary center Cs' in a period of time t to time t+τ with a scalar scaling velocity of s. Then, the following is established:

$$\begin{aligned} Pi'(t+\tau) &= (1+s\cdot\tau)\cdot Pi(t) \\ &= \begin{bmatrix} (1+s\cdot\tau) & 0 \\ 0 & (1+s\cdot\tau) \end{bmatrix} \cdot Pi(t) \end{aligned}$$

The individual object 6-2' is obtained with the temporary scaling center Cs' instead of the actual scaling center Cs. Accordingly, the point Pi' (t+τ) must be translated to the point Pi(t+τ). If a motional velocity vector for the translation is Vp", the following is established:

$$Vp'' = Ds(t+\tau) - Ds(t) = s\cdot\tau\cdot Ds(t)$$

Accordingly, when the point Pi on the individual object 5-2 is shifted to a point on the individual object 6-2 having the scaling center Cs, the following is established:

$$Pi(t+\tau) = Pi'(t+\tau) + Vp''$$
$$= (1 + s \cdot \tau)Pi(t) + s \cdot \tau \cdot Ds(t)$$

If "1" in (1+s·τ) is substituted by an optional value E, it will be (E+s·τ). Then, the following is established:

$$Pi(t+\tau)=(E+s\cdot\tau)Pi(t)+s\cdot\tau\cdot Ds(t)$$

The motional velocity vector Vp" for the scaling corresponds to the motional velocity vector Vp' for the translation, so that it will be collectively expressed with an effective velocity vector V for the translation velocity vector Vp. A parameter needed for the scaling is the scaling velocity s, which is extracted and stored.

Figure 4:
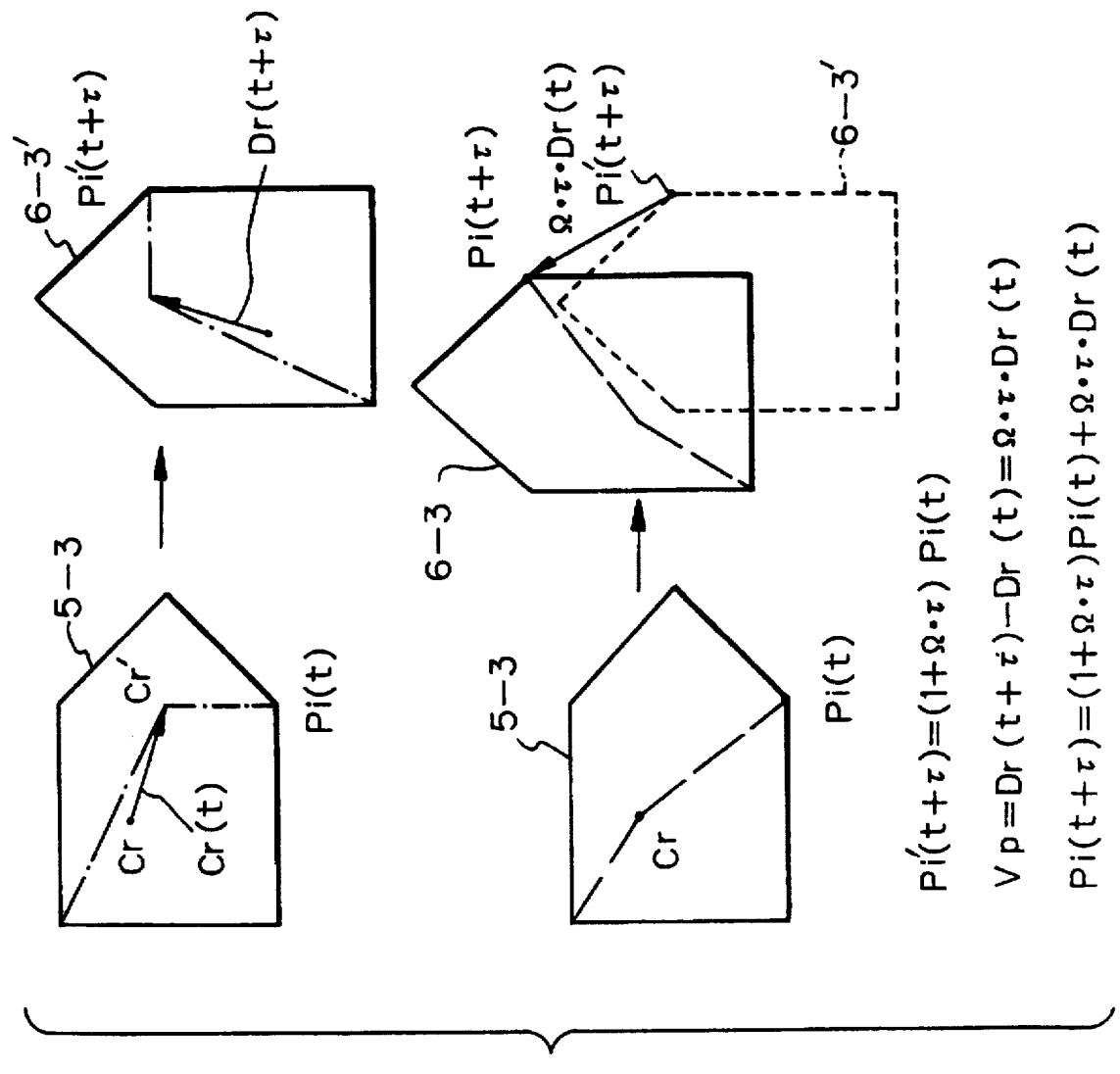
FIG. 4 is a diagram for explaining a technique for extracting parameters for rotation around an in-plane perpendicular axis according to the present invention.

FIG. 4 explains the extracting of parameters for a rotation around an in-plane perpendicular axis. In the figure, an individual object 5-3 is rotated by 90 degrees in a counter-clockwise direction around a rotation center Cr into an individual object 6-3. Generally, the position of the rotation center Cr is unknown. Accordingly, a temporary rotation center Cr' is set as indicated in the upper part of FIG. 4, and the individual object 5-2 is rotated by 90 degrees around the temporary rotation center Cr'. Then, the difference between the rotation center Cr and the temporary rotation center Cr' is corrected. Reference numeral 6-3' is a resultant individual object with the individual object 5-3 turned around the temporary rotation center Cr'.

A point Pi on the individual object 5-3 is rotated around the temporary center Cr' up to a point on the individual object 6-3' in a period of time t to time t+τ with a scalar angular velocity ω around the in-plane perpendicular axis. Then, the rotation Ω·τ in the period τ is as follows:

$$\Omega \cdot \tau = \begin{bmatrix} \cos\omega\cdot\tau & \sin\omega\cdot\tau \\ -\sin\omega\cdot\tau & \cos\omega\cdot\tau \end{bmatrix}$$

$$\approx \begin{bmatrix} 1 & \omega\cdot\tau \\ -\omega\cdot\tau & 1 \end{bmatrix}$$

The point Pi(t) is rotated to the point Pi' (t+τ).

$$Pi'(t+\tau)=(1+\Omega\cdot\tau)\cdot Pi(t)$$

The individual object 6-3' is obtained around the temporary rotation center Cr' instead of the true rotation center Cr. Accordingly, Pi' (t+τ) must be translated to Pi(t+τ). A motional velocity vector Vp''' for the translation is given as follows:

$$Vp'''=Dr(t+\tau)-Dr(t)=\Omega\cdot\tau\cdot Dr(t)$$

Accordingly, when the point Pi on the individual object 5-3 is rotated around the rotation center Cr to a point on the individual object 6-3 between time t and time t+τ, the resultant point is obtained as follows:

$$Pi(t+\tau)=Pi'(t+\tau)+Vp'''=(1+\Omega\cdot\tau)Pi(t)+\Omega\cdot\tau Dr(t)$$

When "1" in (1+Ω·τ) is substituted by an optional value E, the following is established:

$$Pi(t+\tau)=(E+\Omega\cdot\tau)Pi(t)+\Omega\cdot\tau Dr(t)$$

The E and Ω will be represented with the following matrix representations:

$$E=\begin{bmatrix} 1 & 0 \\ 0 & 1 \end{bmatrix}, \Omega=\begin{bmatrix} 0 & \omega \\ -\omega & 0 \end{bmatrix}$$

The motional velocity vector Vp''' for the rotation corresponds to the motional velocity vector Vp' for the translation, so that it will be collectively expressed with the effective velocity vector V for the translation velocity vector Vp. A parameter necessary for the rotation around the in-plane perpendicular axis is an angular velocity ω, which is extracted and stored.

The translation, scaling, and in-plane perpendicular axis rotation are integrated as follows:

$$Pi(t+\tau)=(E+s\cdot\tau+\Omega\cdot\tau)Pi(t)+ Vp'\cdot\tau+s\cdot\tau\cdot Ds(t)+\Omega\cdot\tau\cdot Dr(t)$$

The third and fourth terms can be each integrated into the translation velocity vector Vp by multiplying the distance between the scaling center Cs and the temporary scaling center Cs' or the distance between the rotation center Cr and the temporary rotation center Cr' by the parameter s or Ω, if these distances are determined.

Pi(t+τ) is expressed as follows:

$$Pi(t+\tau)=Pi(t)+Vp'\cdot\tau+s\cdot\tau(Pi(t)+Ds(t))+\Omega\cdot\tau(Pi(t)+Dr(t))$$

where Pi(t)+Ds(t) is a distance vector from the scaling center Cs to the point Pi(t), and Pi(t)+Dr(t) is a distance vector from the rotation center Cr to the point Pi(t).

With the distance vector from the scaling center Cs to the point Pi(t) being γs and the distance vector from the rotation center Cr to the point Pi(t) being γr, the effective motional velocity vector V for the point Pi moved as shown in FIGS. 2 to 4 is expressed as follows, if the time difference τ is small:

$$V = \frac{1}{\tau}(Pi(t+\tau) - Pi(t)) \quad (1)$$
$$= \frac{1}{\tau}(\tau\cdot Vp' + s\cdot\tau\cdot\gamma s + \Omega\cdot\tau\cdot\gamma r)$$
$$= Vp' + s\cdot\gamma s + \Omega\cdot\gamma r$$

If the distance vector V for the point Pi(t) moving to the point Pi(t+τ) between the time t and the time t+τ is measurable, there will be no problem. Even if no relationship between the points is known, the movement is calculable in a manner mentioned below, supposing that the positional change mentioned above is rigid and involves no soft deformation (non-rigid deformation).

Figure 5:
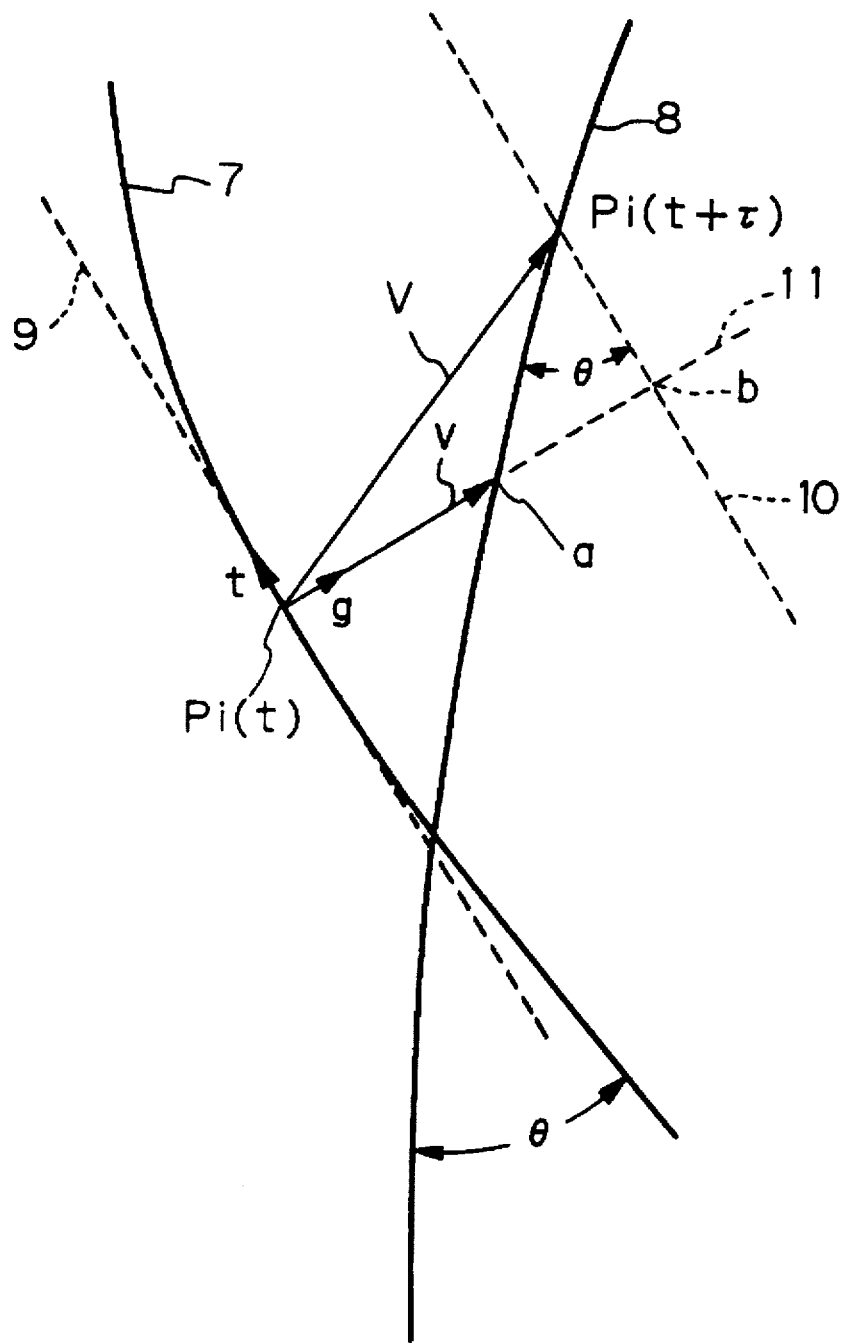
FIG. 5 is a diagram for explaining a change in edges of an individual object at a time t and time t+τ.

FIG. 5 explains that an edge of an individual object at time t changes to an edge of an individual object at time t+τ.

In the figure, reference marks Pi(t) and Pi(t+τ) correspond to those of FIG. 3. Numeral 7 is the edge of the individual object at time t, 8 is the edge of the individual object at time t+τ, 9 is a tangent line passing the point Pi(t) on the edge 7, 10 is a line in parallel with the tangent line 9 and passing the point Pi(t+τ), 11 is a line of force (a normal line) passing the point Pi(t) on the edge 7, g is a unit vector along the line of force, t is a unit vector along the tangent line, and V is the effective motional velocity vector according to the equation (1). A reference mark v is a distance between the edges 7 and 8 in the direction of the unit vector g along the line of force. The distance v corresponds to a motional velocity vector when the point Pi(t) moves to a point "a" on the edge 8 in a unit time period. The distance v is measurable on a dynamic image. A reference mark θ represents a cross angle of the edges 7 and 8.

It is unknown that the point Pi(t) has moved to the point Pi(t+τ) on the edge 8. It can be known, however, that the point Pi(t) has reached the point a on the edge 8 in the direction of the line of force of the edge 7.

In FIG. 5, a value between the points a and b is obtainable by multiplying a tangent component (V·h) of the effective motional velocity vector V by tanθ and a value between the point Pi(t) and the point b corresponds to a normal component (V·g) of the vector V. Accordingly, the following is established:

$$v = (V \cdot g) + (V \cdot h) \tan \theta \qquad (2)$$

In the equations (1) and (2), there are eight unknown figures, i.e., Vpx', Vpy', s, ω, γsx, γsy, γrx, and γry. These unknown figures are determined by measuring v1 to v4 for four points on the edge 7 and substituting the measured values for the equations (1) and (2) in the directions x and y.

Figure 6:
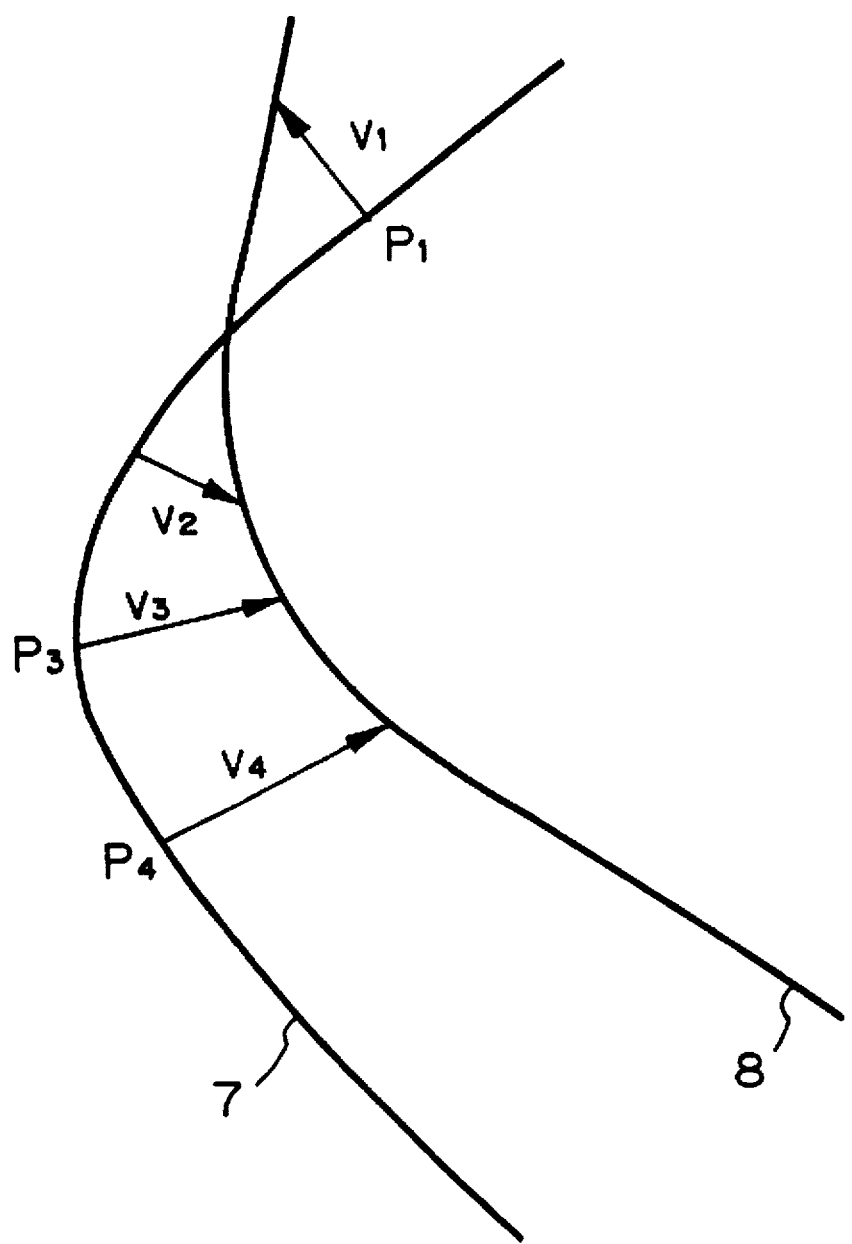
FIG. 6 is a diagram for explaining a way of obtaining vectors v1 to v4 at four points according to the present invention.

FIG. 6 shows a way of obtaining v1 to v4 for four points. In the figure, reference marks 7, 8, and θ correspond to those of FIG. 5.

As described above, the effective motional velocity vector V is obtained by estimating a distance vector in which an objective point Pi(t) has moved to a different objective point Pi(t+τ) during a time period from the time t to the time t+τ. However, it is not always easy to confirm whether or not the former objective point Pi(t) really corresponds to the latter objective point Pi(t+τ).

To cope with this difficulty, it is preferable to extract a contour line (edge) for every individual object which is to be processed. Further, with regard to the four points P1, P2, P3, and P4 among the objective points Pi (i=1, 2, 3, and 4), it is preferable to select characteristic points which are characteristic of the edge, e.g., at least one intersection point and/or at least one inflection point on the above-mentioned edge.

Generally, this kind of edge is provided by an edge defining the shape of the individual object. Further, by utilizing changes in luminance and chromaticity of a certain objective point on the individual object, a structure extended contour line can be obtained inside the shape of the individual object. Alternatively, by utilizing reflected light which is reflected by the individual object when light is illuminated on the individual object, the structure extended contour line can be obtained in a similar manner. Such a structure extended contour line can be considered to be equivalent to the edge defining the shape of the individual object. Therefore, if the edge defining the shape of the individual object and the structure extended contour line are treated as the same kind of edge, it becomes possible to effectively utilize a larger number of the characteristic points.

Generally, once the four points P1, P2, P3, and P4 are selected, eight unknown figures related to the equation (1) can be determined by utilizing simultaneous equations. In this case, it is necessary for these simultaneous equations to be independent of each other.

For example, a process of selecting the four points P1, P2, P3, and P4 is carried out by the following sequences, so as to ensure that the simultaneous equations are independent of each other.

First, a certain point P1 is selected on a contour line (including a structure extended contour line).

Second, a different point P2 is selected on a contour line. At this time, it is checked whether or not the second point P2 is independent of the first point P1. In principle, the selection of the second point P2 is executed repeatedly by moving the second point P2 on the contour line until an adequate point P2 is found out.

Third, after the two independent points P1, P2 are successfully selected, a further different point P3 is selected on a contour line. Also in this case, it is checked whether or not the third point P3 is independent of the first and second points P1, P2.

Finally, similar to the above-mentioned three sequences, a fourth point P4 is selected. Consequently, all the four points P1, P2, P3, and P4 can be selected on the condition that the four points are independent of each other.

However, even in the case where such a selection process is utilized, a value of rank indicating a degree of independence of the simultaneous equations sometimes becomes smaller than eight ("8"), according to some conditions given by the individual object. FIGS. 7 to 13 hereinafter described illustrate exemplary examples in which a value of rank is smaller than "8".

Figure 7:
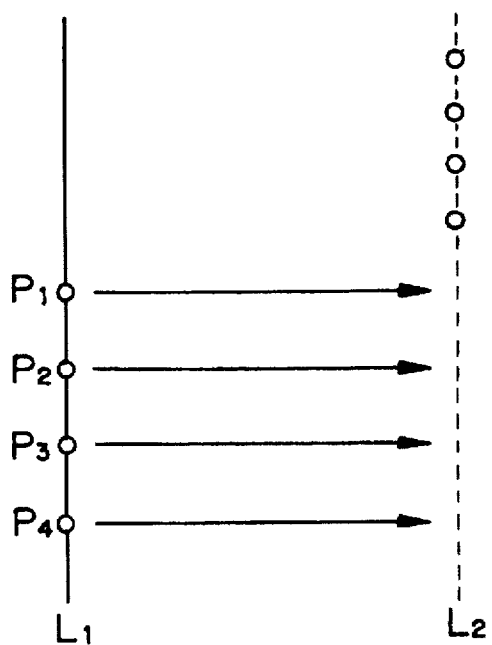
FIG. 7 is a diagram showing a first example in which a value of rank is smaller than "8"

FIG. 7 is a diagram showing a first example in which a value of rank is smaller than "8".

In this figure, an edge L1 moves toward the right direction simply by parallel translation, and consequently an edge L2 is formed. In this case, as apparent from the figure, a value of rank is two ("2"), which is smaller than "8". Therefore, even though simultaneous equations are set up by selecting the four points P1, P2, P3, and P4 on the edge L1, only two unknown figures, i.e., the above-mentioned Vpx' and ω (ω=0), can be determined.

Figure 8:
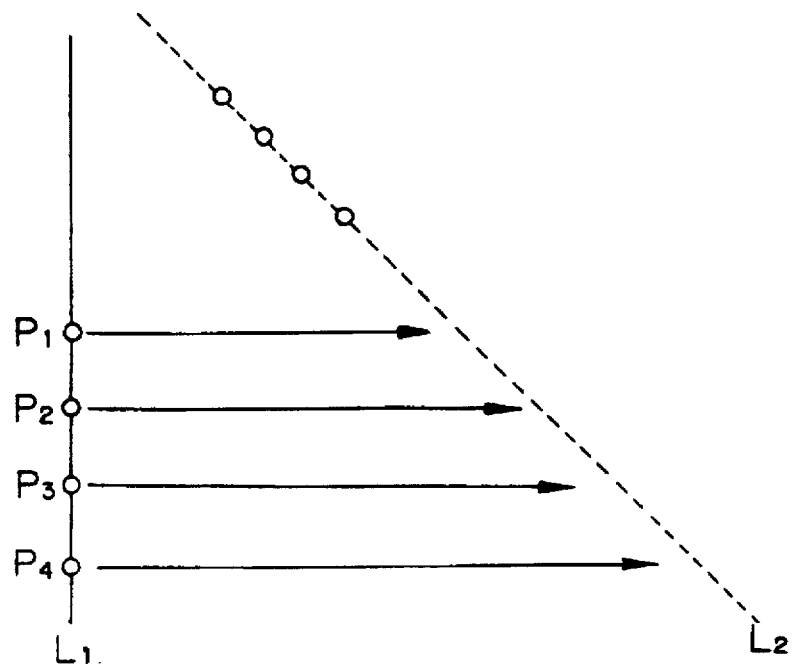
FIG. 8 is a diagram showing a second example in which a value of rank is smaller than "8"

FIG. 8 is a diagram showing a second example in which a value of rank is smaller than "8".

In the figure, an edge L1 moves toward the right direction as it rotates, and consequently an edge L2 is formed. Also in this case, as apparent from the figure, a value of rank is "2". Therefore, even though simultaneous equations are set up by selecting the four points P1, P2, P3, and P4 on the edge L1, only two unknown figures, i.e., the relationship among Vp, Cr and Cs, and ω (ω≠0), can be determined.

Figure 9:
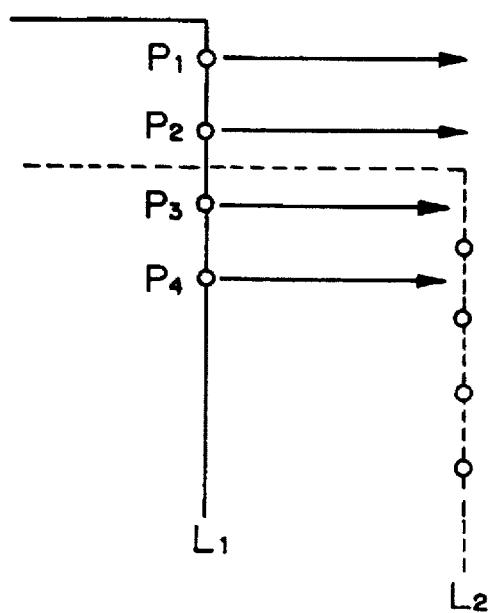
FIG. 9 is a diagram showing a third example in which a value of rank is smaller than "8"

FIG. 9 is a diagram showing a third example in which a value of rank is smaller than "8".

In the figure, an edge L1 moves toward the right direction by parallel translation, and consequently an edge L2 is formed. However, as shown in the figure, when the edge L2 is observed from each point Pi (i=1, 2, 3, and 4) on the edge L1 toward the normal direction, any points on the edge L2, which respectively correspond to the points P1, P2 on the edge L1, cannot be found out. Therefore, a value of a distance v shown in the equation (2) cannot be determined. In this case, the equation (2) can be set up only with regard to the points P3, P4 on the edge L1, and therefore a value of rank is "2".

Figure 10:
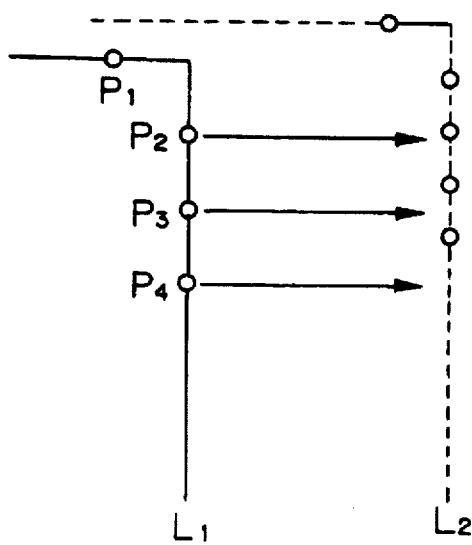
FIG. 10 is a diagram showing a fourth example in which a value of rank is smaller than "8"

FIG. 10 is a diagram showing a fourth example in which a value of rank is smaller than "8".

In the figure, an edge L1 moves toward the right direction by parallel translation, and consequently an edge L2 is formed. However, as shown in the figure, an inflection point exists between the point P1 and the point P2, and therefore a value of rank is "4". In this case, only four unknown figures, i.e., Vpx', γsx, γsy, and ω (ω=0), can be determined.

Figure 11:
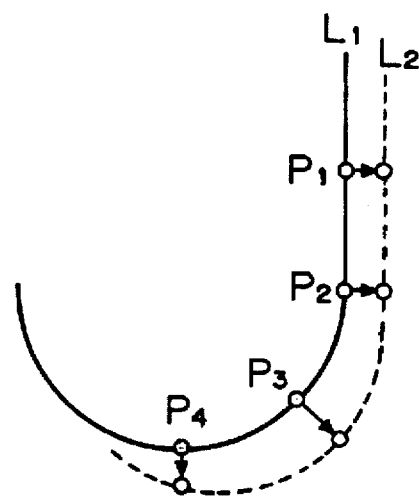
FIG. 11 is a diagram showing a fifth example in which a value of rank is smaller than "8"

FIG. 11 is a diagram showing a fifth example in which a value of rank is smaller than "8".

In the figure, an edge L1 having a curved portion moves toward the oblique direction. As apparent from the figure, a value of rank is "6". In this case, only six unknown figures, i.e., Vpx', Vpy', s, Csx, Csy, and ω (ω=0), can be determined.

Figure 12:
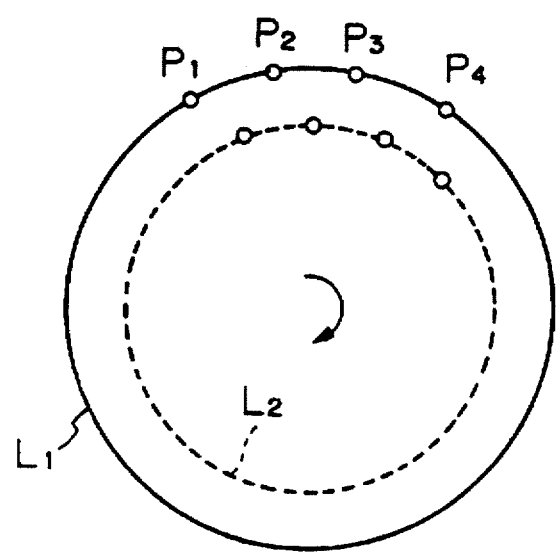
FIG. 12 is a diagram showing a sixth example in which a value of rank is smaller than "8"

FIG. 12 is a diagram showing a sixth example in which a value of rank is smaller than "8".

In the figure, each of an edge L1 and an edge L2 is illustrated with a form of a concentric circle. Further, in the figure, the circle corresponding to the edge L2 is formed when the circle corresponding to the edge L1 is rotated with some angles. In this case, as apparent from the figure, a value of rank is "7". Therefore, all the unknown figures other than e can be determined.

Figure 13:
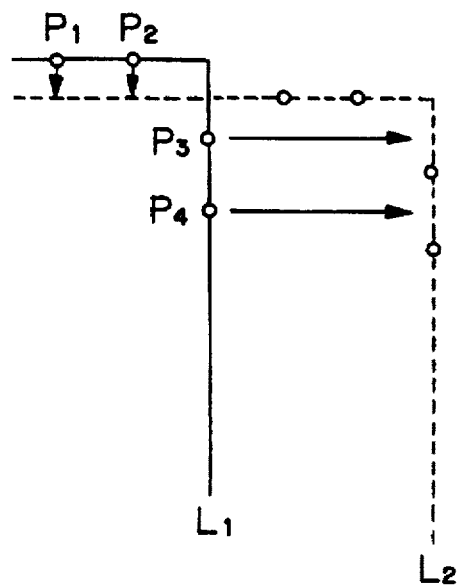
FIG. 13 is a diagram showing a seventh example in which a value of rank is smaller than "8"

FIG. 13 is a diagram showing a seventh example in which a value of rank is smaller than "8".

In FIG. 13, similar to FIG. 10, the objective points are selected in a manner in which an inflection point is positioned between the objective points. As is apparent from the figure, a value of rank is "4". In this case, only four unknown figures, i.e., Vpx', Vpy', γsx, and γsy, can be determined.

Figure 14:
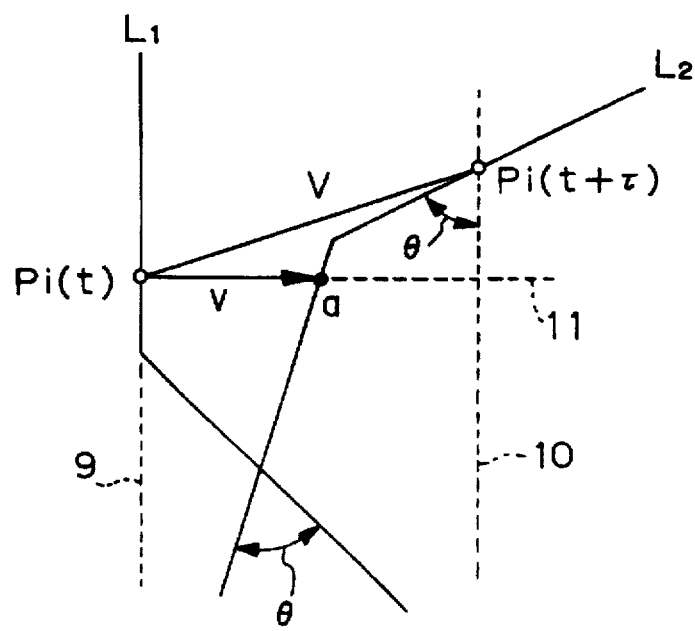
FIG. 14 is a diagram showing an example to which an equation (2) (hereinafter described) cannot be applied.

FIG. 14 is a diagram showing an example to which an equation (2) cannot be applied.

As described above, in the case where a value of rank is smaller than "8", all of the eight unknown figures cannot be determined. Furthermore, in an example shown in FIG. 14, the relationship per se which is to be derived from the equation (2) cannot be established.

In the figure, an edge L1 is rotated and consequently an edge L2 is formed. In this case, since a position where an objective point Pi(t) is selected on the edge L1 is not adequate, the relationship illustrated in FIG. 5 cannot be established.

More specifically, as already described with reference to FIG. 5, a segment is forced to extend from the objective point Pi(t) toward the normal direction, and reaches a point "a" on the edge L2. At this time, a distance v between the objective point Pi(t) and the point "a" is measured. A value of the distance v can be usually represented by the equation (2).

However, in this case, an inflection point exists between the objective point Pi(t) and the point "a". Due to such an inflection point, an assumption necessary for establishing the equation (2) becomes invalid. Therefore, in FIG. 14, the equation (2) per se cannot be applicable. Consequently, even though a solution of simultaneous equations is obtained, this solution will be quite undesirable.

As described in detail with reference to FIGS. 7 to 14, a process of selecting the four objective points P1, P2, P3, and P4 must be carefully carried out. If the thus selected points P1, P2, P3, and P4 have been found not to be adequate, it becomes necessary to select again other objective points P1, P2, P3, and P4.

Figure 15A:
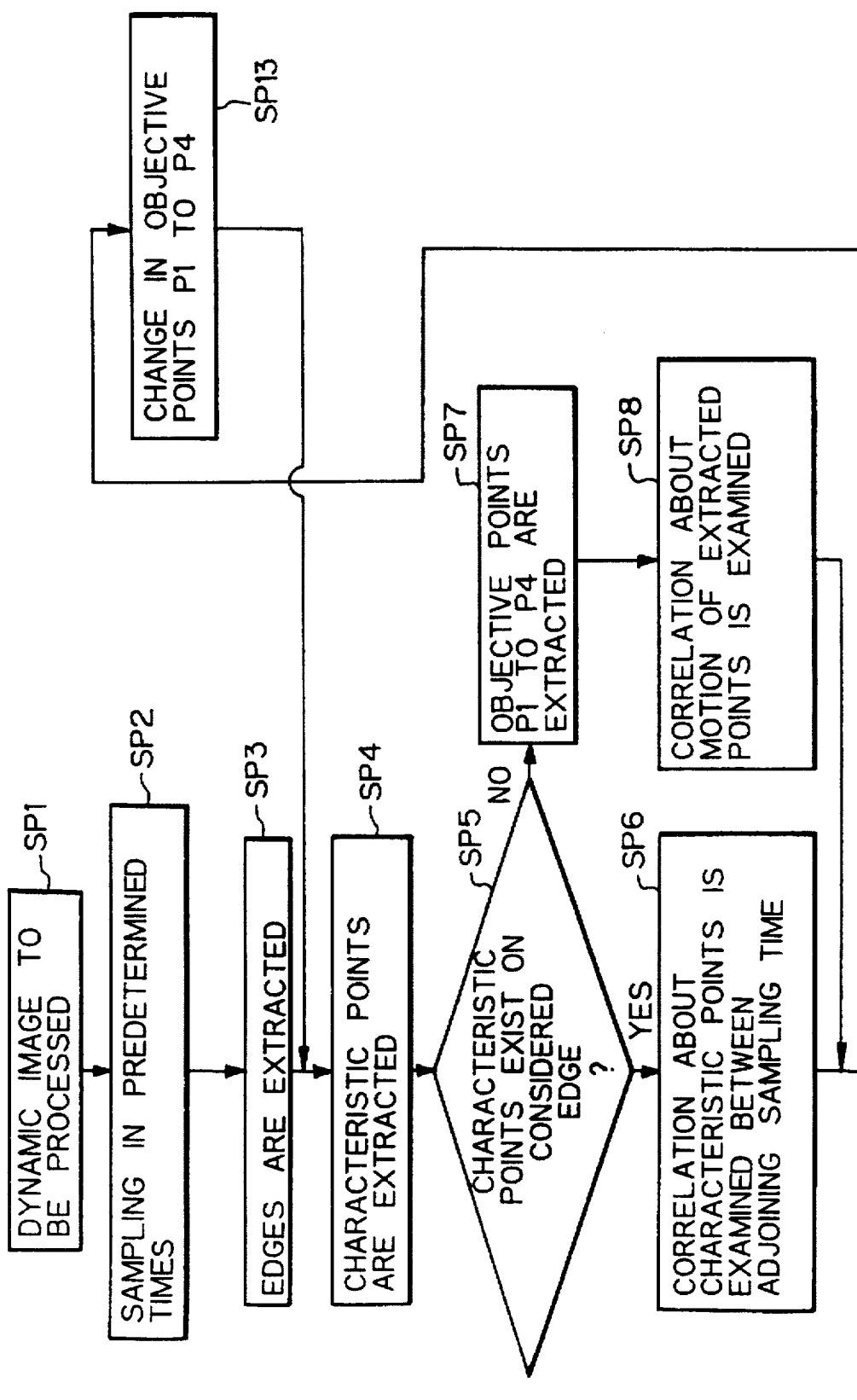
FIG. 15(a) is a part of a flowchart for explaining an exemplary process of determining motional parameters according to the present invention.
Figure 15B:
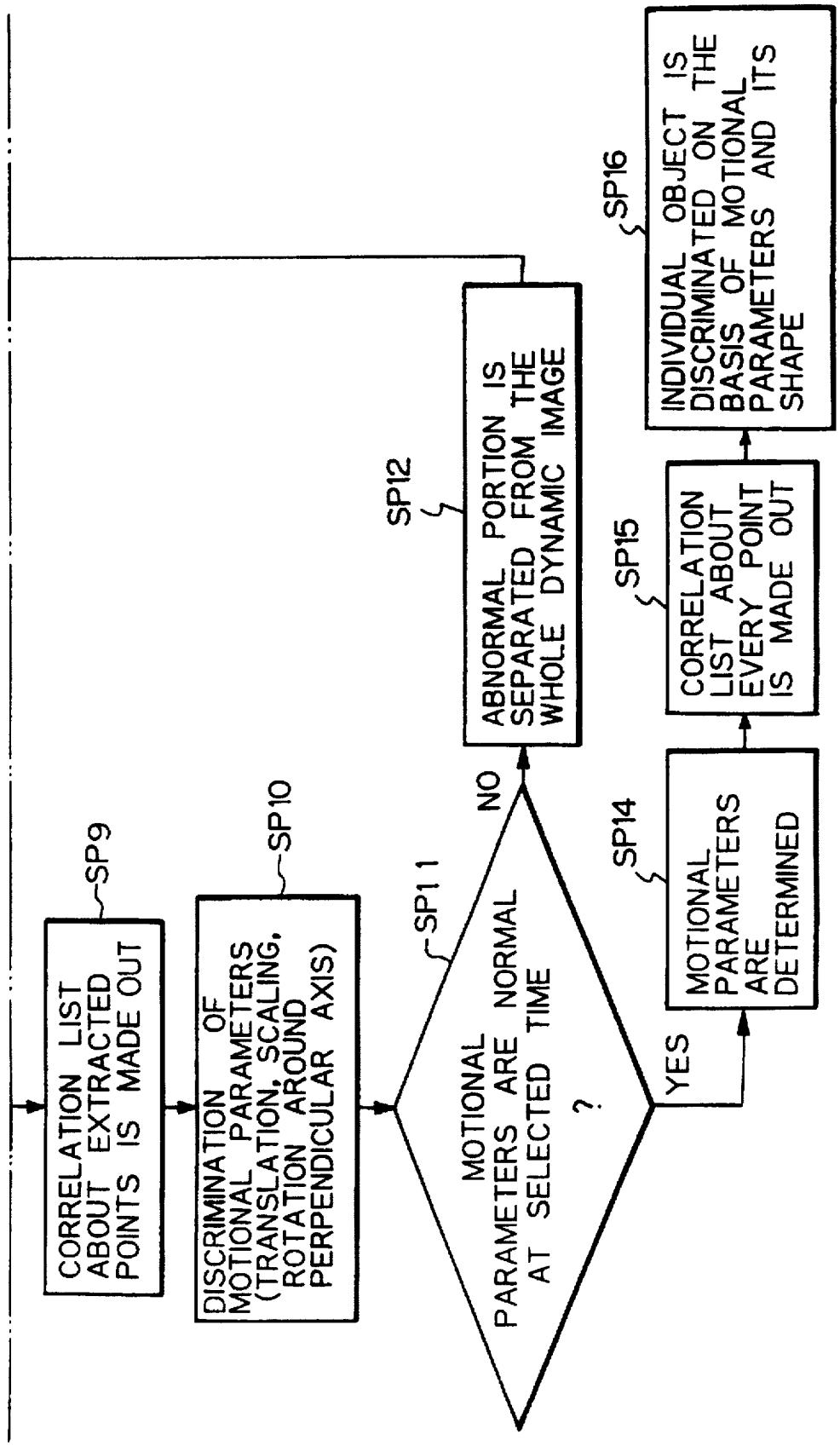
FIG. 15(b) is the remaining part of a flowchart for explaining an exemplary process of determining motional parameters according to the present invention.

FIG. 15(a) is a part of a flowchart for explaining an exemplary process of determining motional parameters according to the present invention; FIG. 15(b) is the remaining part of the same flowchart for explaining this process.

Hereinafter, the process of determining motional parameters will be explained with reference to steps SP1 to SP1 in FIGS. 15(a) and 15(b).

First, in a step SP1 of FIG. 15(a), a dynamic image to be processed, i.e., an individual object, is recorded.

Next, in a step SP2, a sampling operation regarding such an individual object is carried out in predetermined sampling times, e.g., time t and time t+τ.

Further, with a step SP3, in regard to the individual object, a plurality of edges (including structure extended contour lines) are extracted.

In a step SP4, on each of the edges, characteristic points, e.g., at least one intersection point and/or at least one inflection point, are extracted.

In a step SP5, it is checked whether or not any characteristic points exist on the edge which is to be considered.

If it is confirmed that some characteristic points exist on the edge, in a step SP6, the correlation about these characteristic points is examined between adjoining sampling times. Namely, a correspondence relation between some characteristic points on the edge at the time t and other characteristic points on the edge at the time t+τ is confirmed.

On the contrary, if it is confirmed that four characteristic points do not exist on the edge, in a step SP7, four objective points are selected and extracted in an adequate method.

In a step SP8, the correlation about motion of the thus extracted points (selected points) is examined. Namely, correspondence relation between the thus extracted points at the time t and the thus extracted points at the time t+τ is confirmed.

Further, in a step SP9 of FIG. 15(b), the correspondence relation between the selected points (objective points P1, P2, P3, and P4) at the time t and the selected points at the time t+τ is written down on a list. Namely, a correlation list about motion of these selected points is made out.

In a step SP10, with regard to the individual object, a process of discriminating a number of motional parameters is carried out. These motional parameters includes data about translation, scaling, and rotation around an in-plane perpendicular axis.

In a step SP11, the whole of the individual object is examined at a certain selected time T. Further, for every objective point or every group of objective points, it is checked whether or not the motional parameters are normal.

If an abnormal portion, where the motional parameters appear different from the parameters in the other portions of the whole dynamic image, has been found out, this abnormal portion is separated from the whole dynamic image (a step SP12).

Further, in a step SP13 of FIG. 15(a), with regard to the thus separated portion, four objective points P1, P2, P3, and P4 are changed. Subsequently, the process goes back to the step SP4 and the above-mentioned steps SP4 to SP11 are executed again.

On the contrary, if it is confirmed that any abnormal portion does not exist, in a step SP14, all the motional parameters are determined.

In a step SP15, a correspondence relation between the objective points P1, P2, P3, and P4 at every sampling time is established. Further, a correlation list about the motional parameters for every objective point is made out.

Finally, in a step SP16, the dynamic image to be processed (individual object) is discriminated and plotted, on the basis of the motional parameters and the shape of the dynamic image.

In the above explanation, the edges shown in FIGS. 5 and 6 are known. They are, however, usually unknown. To extract the edges, the following disclosed techniques are employable:

(a) Japanese Unexamined Patent Publication (Kokai) No. 63-299594 (A Color Image Transmitting and Processing System)

(b) Japanese Unexamined Patent Publication (Kokai) No. 1-213761 (A Color Image Edge Detecting, Transmitting, and Processing System)

(c) Japanese Unexamined Patent Publication (Kokai) No. 2-208781 (A Color Image Drawing Workstation)

(d) Japanese Unexamined Patent Publication (Kokai) No. 3-267879 (A Scalar Data Processing System)

(e) Japanese Unexamined Patent Publication (Kokai) No. 4-287180 (A Color Image Edge Detecting System).

These techniques consider the luminance and chromaticity components of an image, find an edge according to points where the luminance components change, and carry out divergence and rotation operations on the chromaticity components. Positions where these operations provide large values correspond to an edge. The edge is surely extracted. The above techniques are based on the facts that a position where the color of the image changes is equal to a position where the operations provide large values and that a position where the luminance of the image changes corresponds to a shaded curve. According to these facts, a structure extended contour line is extracted in each individual object in the image. The edges (contour lines) and structure extended contour lines are used as the edges of FIGS. 5 and 6, to carry out the above process.

A principle of the technique of employing a chromaticity component will be explained. A color image may be divided into luminance and chromaticity components, and the chromaticity component is usually represented with vector signals I and Q. According to an NTSC television transmission system, the vector signals are represented with a vector W as follows:

$$W = \begin{bmatrix} I \\ Q \end{bmatrix}$$

In this way, the chromaticity component is represented with the vector W. The vector W can be expressed as follows:

$$W = \begin{bmatrix} \xi \\ \eta \end{bmatrix}$$

By applying the Helmholtz theorem, the following is established:

W=grad φ+rot (A·k)

$$W = \begin{bmatrix} \xi \\ \eta \end{bmatrix} = \begin{bmatrix} \phi x \\ \phi y \end{bmatrix} = \begin{bmatrix} Ay \\ -Ax \end{bmatrix}$$

where φ is scalar potential such as brightness and A·k is a vector potential with a unit vector k in the direction of an axis z orthogonal to the plane of FIG. 1.

φx=∂φ/∂x
φy=∂φ/∂y
Ax=∂A/∂x
Ay=∂A/∂y

Here, div W with respect to the vector W is calculable as follows:

div W=div·grad φ+div·rot (A·k)=div·grad φ

Then, the following is obtained:

ξx+ηy=φxx+φyy    (3)

With respect to the vector W, rot W is calculable as follows:

rot W=rot·rot (A·k)

Then, the following is obtained:

ξy−ηx=Axx+Ayy    (4)

where:
ξx=∂ξ/∂x
ξy=∂ξ/∂y
ηx=∂η/∂x
ηx=∂η/∂y
φxx=∂²φ/∂x²
φyy=∂²φ/∂y²
Axx=∂²A/∂x²
Ayy=∂²A/∂y²

The left side of each of the equations (3) and (4) is measurable. By solving the equations (3) and (4), φ and A can be obtained.

The φ is a lamellar component and potential, which is expressed as a linear segment with respect to background disks having different colors. A is a potential representing a vortex component, which is expressed as a curved segment with respect to the same background disks.

Accordingly, transmitting the lamellar, vortex, and luminance components enables a reception unit to reproduce an original color image.

Simulations carried out with a GIRL reference color image according to the Society of Motion Picture and Television Engineers (SMPTE) of the U.S.A. reveal that the energy of A is only 2.25% of that of the φ, so that the vortex component corresponding to A is omissible or transmittable with a very small quantity of data, to reproduce original color images with no deterioration in the quality thereof.

The structure extended contour line is a segment such as a color boundary, which is virtually obtained according to chromaticity components and color changing points.

For each objective point on an individual object, the following data are obtained at time t:

(x coordinate value), (y coordinate value), (luminance value), and (chromaticity vector value) Similarly, the following data are obtained at time t+τ for the objective point:

(x' coordinate value), (y' coordinate value), (luminance value), and (chromaticity vector value).

Here, the luminance value and chromaticity vector value may be copied from the data at the time t, if the luminance and chromaticity are unchanged.

Among the objective points each having the above data structure, those corresponding to chromaticity vector changing positions are connected to provide a contour line and a structure extended contour line. The edges 7 and 8 shown in FIGS. 5 and 6 are the contour line and the structure extended contour line.

In one individual object, there may be a plurality of structure extended contour lines. Many objective points may be set on the structure extended contour lines, and each of the objective points may provide a translation velocity vector Vp'. If the shape of an individual object is known, the objective points will be used to provide each coordinate point in the individual object with a translation velocity vector Vp'.

If the translation velocity vector Vp' is obtainable for each of many coordinate points on an individual object, the following advanced process is achievable.

A conventional image processing technique usually processes two-dimensional individual objects. Often, it is required to process three-dimensional individual objects. In this case, it is required to deal with rotation around an in-plane axis (an axis present in an x-y plane).

Figure 16:
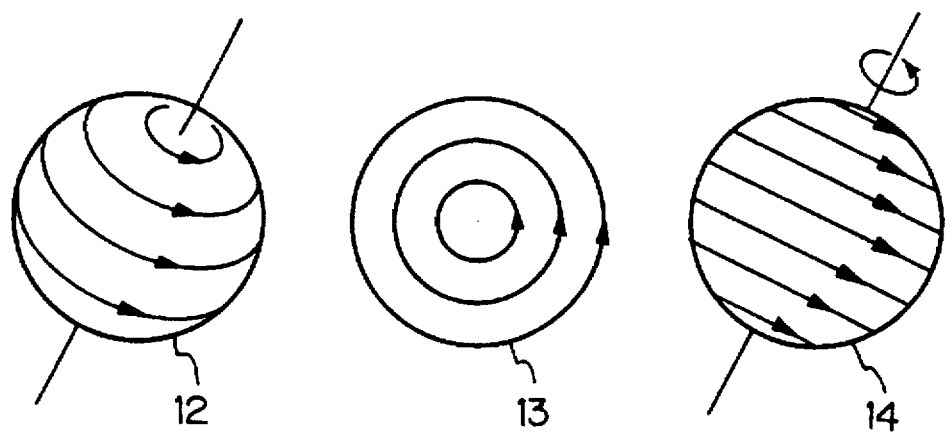
FIG. 16 are schematic views for explaining the rotation of an image on a screen.

FIG. 16 explains the rotation of an image plotted on a screen. A three-dimensional individual object is rotated around an optional axis as indicated by reference numeral 12. The rotation is the sum of rotation 13 around an in-plane perpendicular axis and rotation 14 around an in-plane axis. The extracting of parameters for the in-plane axis rotation will be explained.

A motional velocity vector Vp' is obtained for each main coordinate point on the individual object, as mentioned above. After the motional velocity vector Vp' of each objective point is obtained according to a structure extended contour line, the motional velocity vectors Vp' of other coordinate points are obtained by interpolation. If required, the obtained values may be corrected and smoothed.

Such a process is carried out through the following steps:

(A) The motional velocity vector Vp' of each coordinate point is obtained.

(B) A contour line of each individual object is obtained at each time point, and an average of the motional velocity vectors Vp' at coordinate points on the contour line is obtained.

(C) According to the motional velocity vector Vp' of each coordinate point, div Vp' and rot Vp' are calculated.

Figure 17:
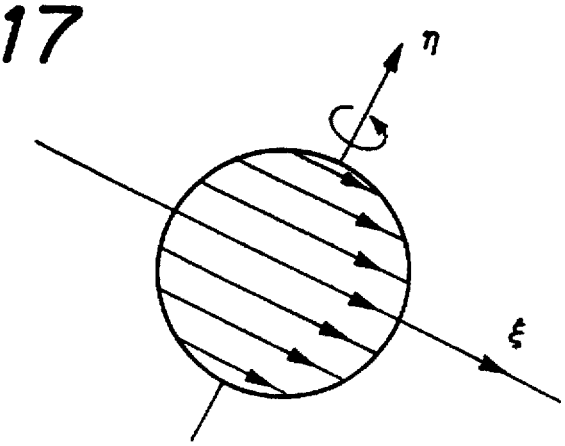
FIG. 17 is a schematic view for explaining the rotation of an image around an in-plane axis.

(D) As shown in FIG. 17, the direction of a motional vector for the in-plane axis rotation is set as $\xi$. Then, the motional velocity vector in the direction $\xi$ is given as $V(\xi)$. The rot Vp' is given as follows:

$$\text{rot } Vp' = \partial V(\xi)/\partial \eta$$

In the vicinity of a point where the rot Vp' is zero, the motional vector for the in-plane axis rotation is in the direction of $\xi$, and only the value thereof changes. (The direction of a motional vector for translation is fixed. In addition, the value thereof is fixed in the individual object.)

As mentioned above, the motional velocity vector Vp' is obtained for the point where the value of the rot Vp' is zero. Thereafter, the following process is carried out:

(E) An averaged Vp' that is considered to be caused by the translation is subtracted from the obtained velocity vector Vp', and according to a result of the subtraction, a distance from the rotation axis to the surface of the individual object in the direction of an axis z is sequentially obtained.

(F) The div Vp' is given as follows:

$$\text{div } Vp' = \partial v(\xi)/\partial \xi$$

Figure 18:
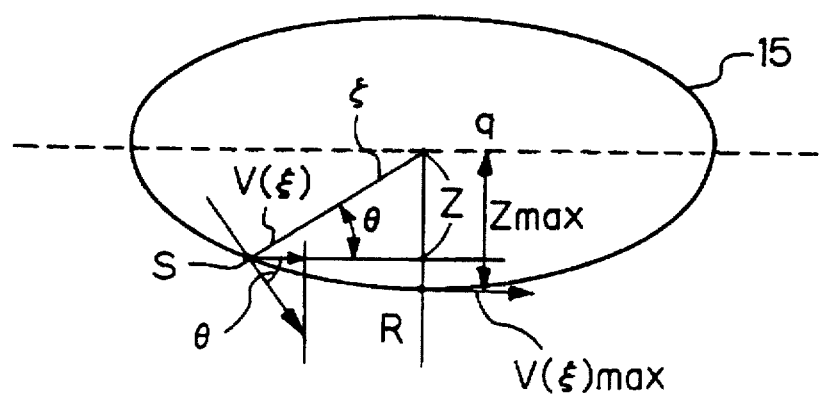
FIG. 18 is a schematic view for explaining a vector v(ξ) for the rotation around an in-plane axis.

The point where the value of the div Vp' is zero corresponds to a point R shown in FIG. 18, if the individual object has a convex cross-sectional shape. In FIG. 18, reference numeral 15 is an external shape obtained by cutting the individual object with a plane orthogonal to the axis z (not shown), q is a point on a rotation center axis, and Zmax is a distance between the points q and R. Reference mark $V(\xi)$ max is a motional velocity vector at the point R. If Zmax is obtained, the following is established:

$$V(\xi max) = \omega q \cdot Zmax$$

Accordingly, the rotational angular velocity ωq is obtained. In practice, the process steps (E) and (F) are repeated to increase accuracy.

In this way, the parameters ωq and Zmax are obtained. Thereafter, the soft deformable motion velocity vector extract unit 2 is activated.

In FIG. 18, the motional velocity vector $V(\xi)$ at a point S on the surface of the individual object and the rotational angular velocity ωq are obtained, and then a distance $\zeta$ between the points q and S in FIG. 9 is expressed as follows:

$$V(\xi) = \omega q \cdot \partial \sin \theta = Z \cdot \omega q$$

Accordingly, a distance Z corresponding to the point S is obtainable. The distance Z may be obtained for each point on the external shape 15 of the individual object, to thereby determine the three-dimensional shape of the individual object. Plotting a line on which the div Vp' is zero and a line on which rot Vp' is zero will concretely provide the three-dimensional shape of the individual object. A point where div Vp'=0 and rot Vp'=0 corresponds to a peak nearest to this side on the axis z of the individual object.

When the individual object rotates around an in-plane axis, part of the object that is visible on the screen gradually hides behind the screen, and the back of the object that has been invisible gradually becomes visible on the screen.

The visible shapes of the individual object at various time points are stored as the surface and back images of the object and are used for dynamic image processing.

As described above, in FIGS. 16 to 18, it becomes possible to extract a segment, which is obtained by connecting points where each value of the div Vp' is zero with each other, and also obtained by connecting points where each value of the rot Vp' is zero with each other. Further, it becomes possible to extract a point where the value of the div Vp' is zero and the value of the rot Vp' is zero. Further, it becomes possible to estimate the motional velocity vector when the individual object is rotated around the in-plane axis.

In addition to the above-mentioned case, by utilizing changes in reflected light which is reflected by the individual object when light is illuminated on the individual object from one direction, it also becomes possible to estimate the motional velocity vector when the individual object is rotated around the in-plane axis. Similarly, by utilizing a highlight line which is formed by connecting together a plurality of points in each of which an intensity of the reflected light becomes maximum, it also becomes possible to estimate the above-mentioned motional velocity vector.

Figure 19:
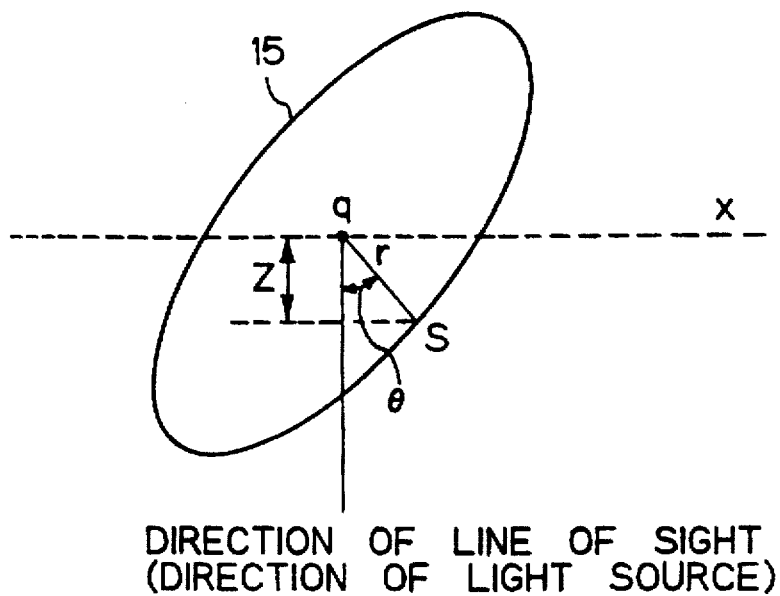
FIG. 19 is a schematic view for explaining a first condition in which a highlight line is generated.

FIG. 19 is a schematic view for explaining a first condition in which a highlight line is generated.

In the figure, the direction of the line of sight is the same as the direction of the light source, i.e., the direction from which light is illuminated on the individual object.

As is apparent from FIG. 19, a distance Z between a point q and a point S in the direction of the line of sight is expressed as follows:

$$Z = r \cos \theta$$

Accordingly, a gradient of the surface of the individual object at the point S with respect to the direction of an axis x is expressed as follows:

$$dZ/d\theta = (dr/d\theta) \cos \theta - r \sin \theta$$

To allow the reflected light at the point S become a maximum, compared with the reflected light at other points, it is necessary for a tangent plane at the point S to be perpendicular to the direction along the distance Z.

Accordingly, the following condition is obtained:

$$dZ/d\theta = 0$$

From this condition, the following relation is established:

$$dZ/d\theta = (dr/d\theta) \cos \theta - r \sin \theta = 0 \tag{5}$$

Therefore, the following equation is obtained:

$$(dr/d\theta) = \tan \theta$$

The reflected light becomes a maximum at a series of points where this equation is satisfied for every point.

Consequently, the series of points appear as a highlight line.

Figure 20:
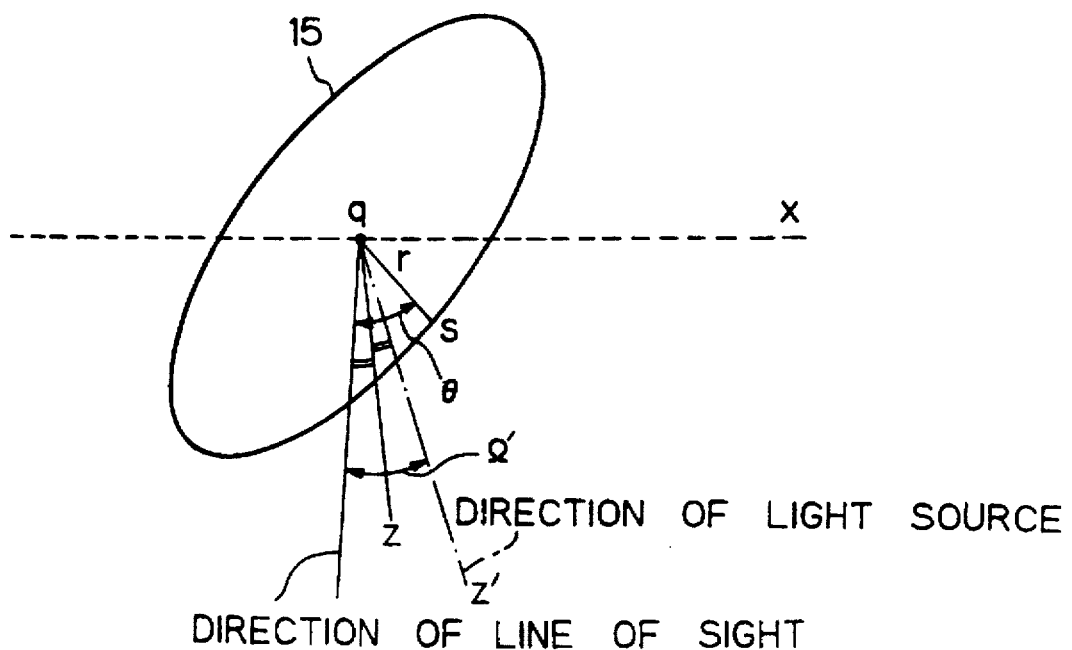
FIG. 20 is a schematic view for explaining a second condition in which a highlight line is generated.

FIG. 20 is a schematic view for explaining a second condition in which a highlight line is generated.

The reference numerals in FIG. 20 correspond to those in FIG. 19.

In the figure, the direction of the line of sight is different from the direction of the light source by an angle $\Omega'$. Here, the direction of the light source is defined as the direction of an axis z'.

In this case, a value of a distance Z' (not shown in FIG. 20) between a point q and a point S in the direction of the line of sight (direction of an axis z') is given by a vector sum of a value of a distance in the direction of an axis z and a value of a distance in the direction of an axis x.

Accordingly, a distance Z' between a point q and a point S in the direction of the line of sight is expressed as follows:

$$Z = Z \cos(\Omega'/2) + x \sin(\Omega'/2)$$

Therefore, a highlight line is given by a series of points where the following equation is satisfied for every point:

$$dr/d\theta = r \tan(\theta - (\Omega'/2)) \qquad (6)$$

Figure 21:
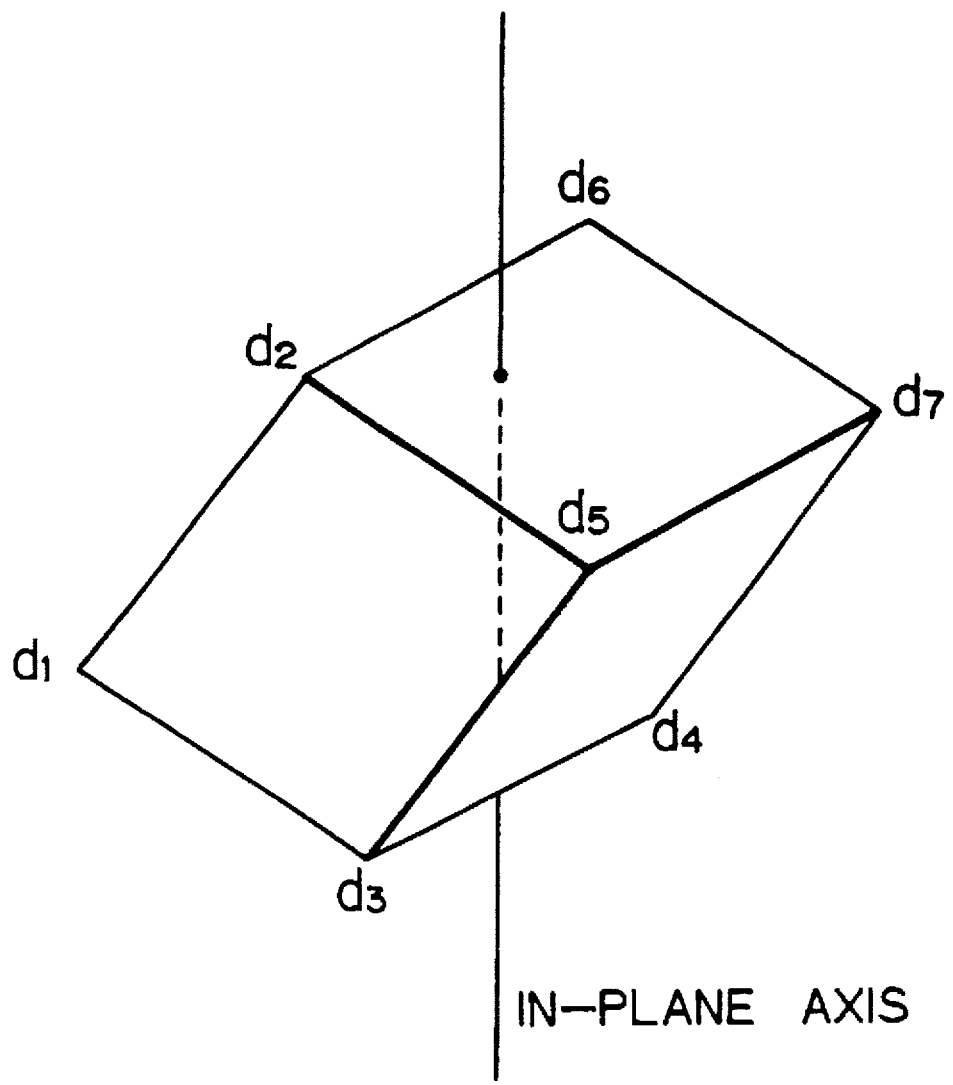
FIG. 21 is a schematic view for explaining a condition in which the rotation around an in-plane axis in a parallelepiped is generated.

FIG. 21 is a schematic view for explaining a condition in which the rotation around an in-plane axis in a parallelepiped is generated.

Figure 22B:
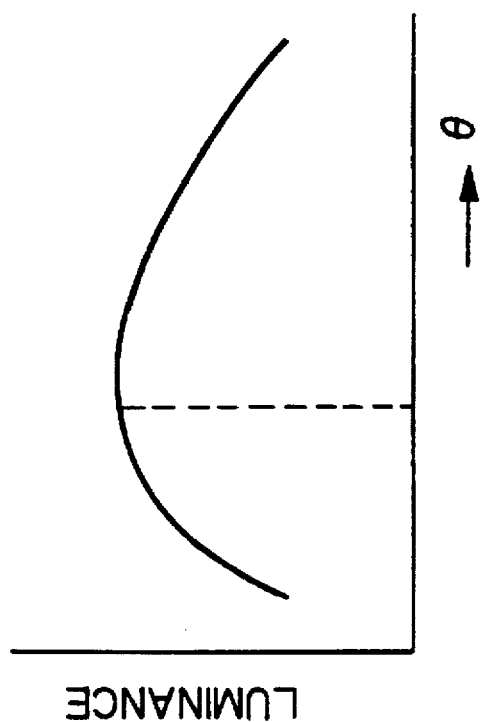
FIG. 22(b) is a graph for explaining a change in luminance value when an individual object as shown in FIG. 19
Figure 22A:
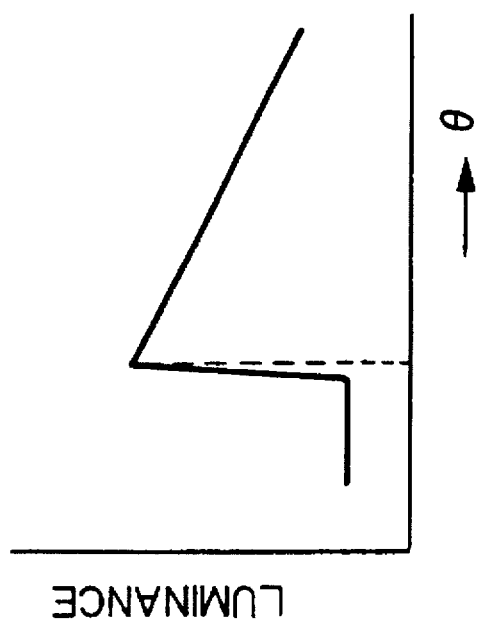
FIG. 22(a) is a graph for explaining a change in luminance value when the parallelepiped as shown in FIG. 21 is rotated around an in-plane axis.

In the figure, the individual object has a form of a parallelepiped. In this case, as shown in a graph of FIG. 22(a), the luminance value in the reflected light from the parallelepiped changes in a form of a broken line or in a stepped form (stepwise), as the angle θ changes when such a parallelepiped is rotated around an in-plane axis.

On the other hand, it is assumed that the individual object has a shape such that a cross section thereof is indicated by the reference numeral 15 in FIG. 19 or FIG. 20, and is rotated around an in-plane axis. In this case, as shown in a graph of FIG. 22(b), the luminance value in the reflected light changes in a form of a gently curved line, as the angle θ changes when the individual object is rotated around an in-plane axis.

As the highlight line which is typically represented by the above-mentioned equations (5) and (6), a highlight line in a vertical direction can be considered, as well as a highlight line in a horizontal direction as described above.

According to a movement of a given kind of individual object, highlight lines in a horizontal direction and a vertical direction move as follows.

(1) In the case where the movement of the individual object relates to a translation, each highlight line moves in translation.

(2) In the case where the movement of the individual object relates to scaling, a length of a segment which defines each highlight line is enlarged or contracted.

(3) In the case where the movement of the individual object relates to a rotation around an in-plane perpendicular axis, highlight lines in a horizontal direction and a vertical direction respectively move, as the angle θ changes in the shape in a horizontal cross section of the individual object and changes in the shape in a vertical cross section thereof. In this case, it should be noted that an intersection point of the two kinds of highlight lines does not move.

Figure 23:
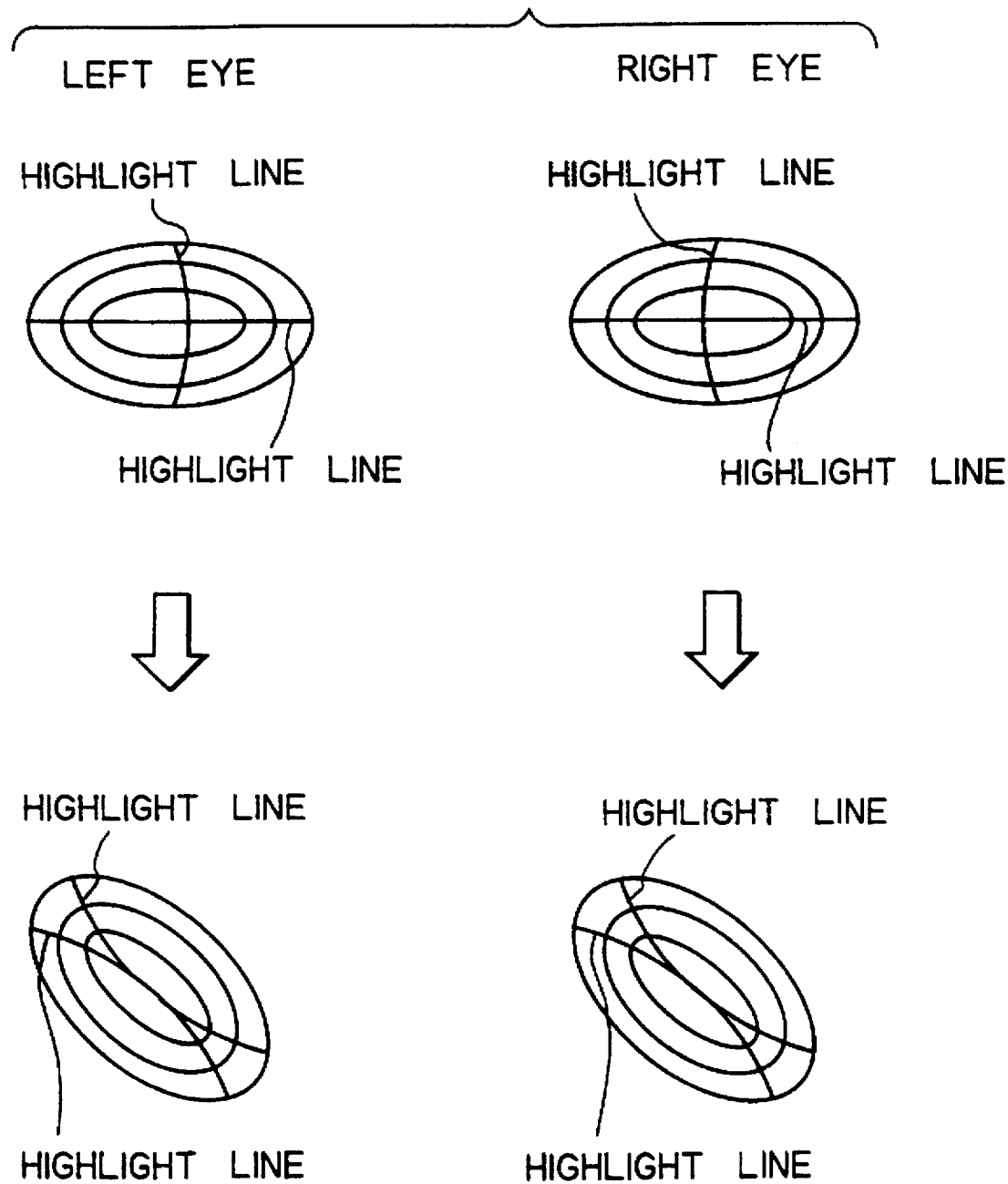
FIG. 23 are views for explaining a movement of each highlight line when a spheroid is rotated around an in-plane perpendicular axis.

FIG. 23 are views for explaining a movement of each highlight line when a spheroid is rotated around an in-plane perpendicular axis.

In the figure, a plurality of lines, each of which indicates a region having an equal luminance value in the individual object, are illustrated in a form of contour lines. Further, the left part of FIG. 23 illustrates the movement of highlight lines in a horizontal direction and a vertical direction when the individual object is observed by a left eye. On the other hand, the right part of FIG. 23 illustrates the movement of the two kinds of highlight lines when the individual object is observed by a right eye.

When the individual object having a spheroid is rotated around an in-plane perpendicular axis, all the contour lines rotate in a manner exactly the same as the rotation of the individual object, as shown in FIG. 23. However, the highlight lines move as shown in the lower part of FIG. 23, with the rotation of the individual object. In this case, an intersection point of the two kinds of highlight lines in each of the right part and left part of FIG. 23 is fixed.

As described above, by examining the movement of the highlight lines, it becomes possible to easily recognize the shape (i.e., three-dimensional shape) of the individual object. Further, since the intersection point of the highlight lines does not move, such an intersection point can be utilized as one of the above-mentioned objective points Pi.

Especially, in the case where the movement of the individual object relates to a translation, a correspondence relation between an intersection point of the highlight lines at time t and an intersection point of the highlight lines at time t+τ can be examined. Consequently, a translation velocity vector can be easily obtained.

Further, when the individual object rotates around an in-plane axis, a motional velocity vector $V(\xi)$ on a point (a predetermined point) on the surface of the individual object changes in a sinusoidal waveform as such a point moves along the direction of an axis z (depth direction) with the rotation of the individual object. Therefore, by utilizing the above-mentioned point, the three-dimensional shape of the individual object can be easily recognized. For example, in the individual object as shown in FIG. 21, it is possible to utilize changes in the motional velocity vector $V(\xi)$ on each of illustrated vertexes d1 to d7.

The motional velocity vector plot unit 220 uses the parameters provided by the motional velocity vector extract unit 210.

The rigid motion velocity vector plot unit 3 carries out the following process. It sets each objective point on the individual object and generates contour lines and structure extended contour lines. The following data are given for each of the objective points:

(x coordinate value), (y coordinate value), (luminance value), and (chromaticity vector value).

According to these data, the luminance value and chromaticity value of each point are calculated. The luminance and chromaticity values on the contour line and structure extended contour line are provided by interpolation. The luminance and chromaticity values of each coordinate point in an area between the contour line and the structure extended contour line are provided by interpolation.

In this way, a still image (static image) at time t is obtained with the individual object being considered as a rigid body. Then, the parameters for the rigid motion are applied to main coordinate points, to start generating a still image at time t+τ with the individual object being handled as a rigid body. This process also starts from generating a contour line and a structure extended contour line.

The soft deformable motion velocity vector plot unit 4 employs a point on the image at time t as a start point to set a point on the image at time t+τ. Since the motional velocity vector from the start point to the point at the time t+τ is given, the point determined by the motional velocity vector is set as the point on the image at the time t+τ.

Figure 24:
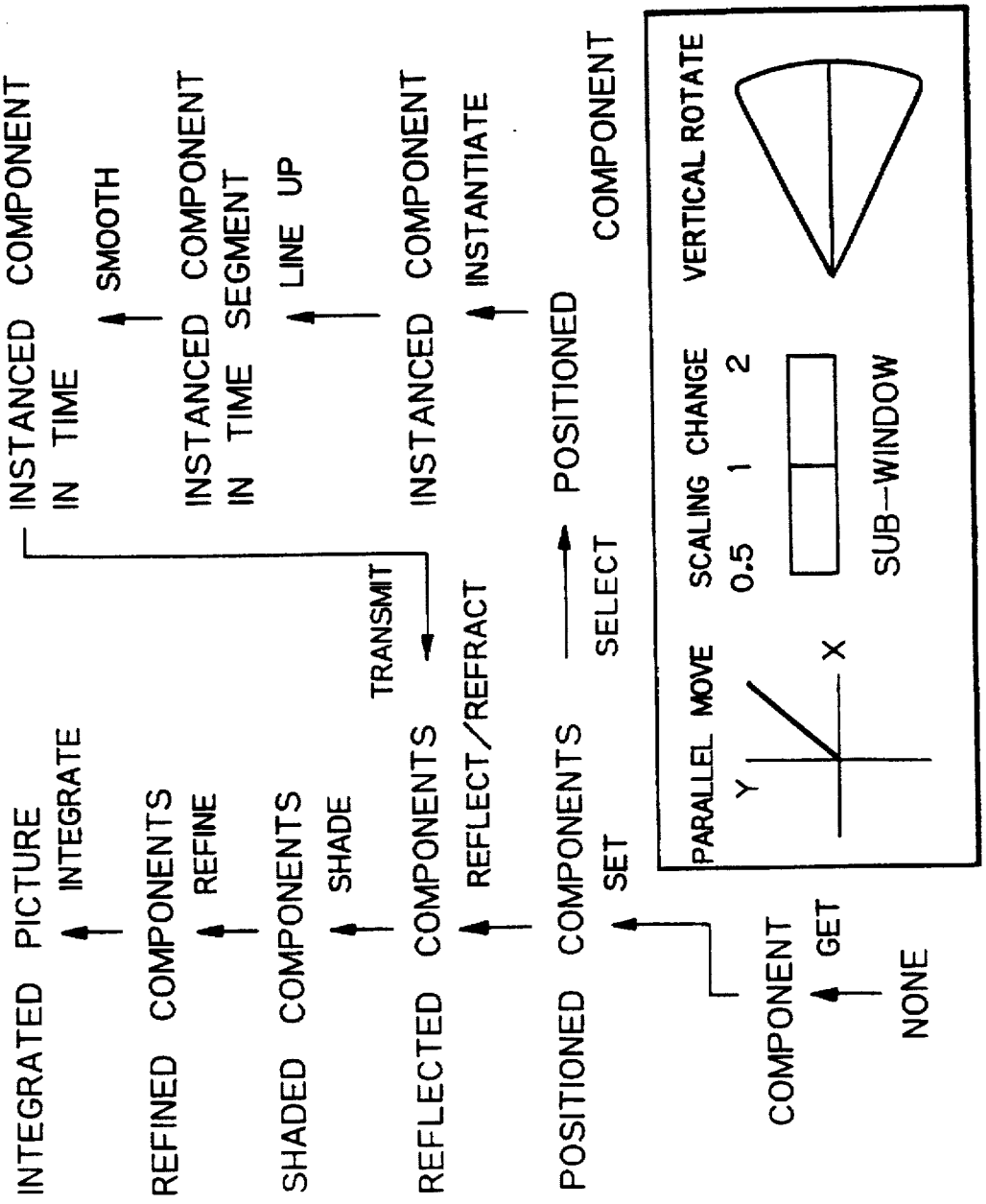
FIG. 24 is a diagram for explaining an image plotting process according to the present invention.

FIG. 24 explains the plotting process. The left half of the figure corresponds to the process of plotting a still image, and the right half of the figure corresponds to the process of supporting the still image plotting process when plotting a dynamic image. A sub-window shown in the lower right part of the figure is employed to plot the rigid motion of each individual object. The image of an individual object at time t+τ is generated in the sub-window and is copied on the image at time t.

Reference marks in the figure will be explained.

(a) NONE

This indicates an initial state in a structure network.

(b) COMPONENT

This indicates a plotted state in an element network, or a state that a reference element image stored in a database is displayed on an element canvas. The element image is displayed according to a function GET.

(c) POSITIONED COMPONENTS

This indicates a state that the element image displayed on the element canvas is put on a structure canvas. The image is provided with basic context according to a function SET (involving COPY, SCALE, ROTATE, and MOVE) defined by a sub-net and is put on the structure canvas. The COPY, SCALE, and ROTATE are simultaneously carried out due to the definition of a matrix.

(d) REFLECTED COMPONENTS

This is a state to express phenomena that occur when light hits the surface of the object due to the strength, incident angle, reflection, and refraction of the light. The phenomena are expressed with processes REFLECT and REFRACT defined in the sub-net and simultaneously carried out.

(e) SHADED COMPONENTS

This is a state to define a shaded polygonal shape due to light and lighting according to a user's instruction. Since the shading is more dependent on environments than the reflection and refraction, the shading is carried out after the reflection and refraction process. The shading is carried out according to a function SHADE.

(f) REFINED COMPONENTS

This is a state to correct inconsistency with environments such as highlight lines on the element images processed by the structure network. This correction is made according to a function REFINE.

(g) INTEGRATED PICTURE

This is a state with a completed image. Images and contexts are integrated into one according to a function INTEGRATE.

(h) POSITIONED COMPONENT

This indicates a state that element image data has been transferred from the still image unit. The selected and transferred element images are moved, scaled up or down, and rotated according to INSTANTIATE.

(i) INSTANCED COMPONENT

A state at each main time point is determined when the element images are moved, scaled up or down, and rotated according to the INSTANTIATE.

(j) INSTANCED COMPONENT IN TIME SEGMENT

The data set for the main time points in the INSTANCED COMPONENT are sequentially arranged according to a time flow. In the determined sequence of the main time points, each segment between the main time points is interpolated.

(k) INSTANCED COMPONENT IN TIME

The interpolated data of the segments are combined to determine the element images at all time points.

The dynamic image unit and still image unit of the structure network exchange the following parameters to generate a dynamic image.

(l) SELECT

The selected element image data and parameters are transferred from the still image unit to the dynamic image unit. The element images combined in the POSITIONED COMPONENTS of the still image unit are again decomposed and transferred to the dynamic image unit, to monitor the motion of each of the element images.

(m) TRANSMIT

The element image data and parameters generated for every time point by the dynamic image unit of the structure network are sent back to the still image unit. The still image unit carries out a reflection process, a refraction process, a shading process, and a movement of highlight line on the element images, to complete interpolated images for all time points.

On an assumption that the main factors to generate an image model having the feel of a material and real existence are light, lighting, shade, brightness or darkness, and material, the image of an object is easily modeled according to phenomena such as reflection and refraction occurring when light irradiates the object, without using a ray tracing method. The model is processed at high speed with use of an element network defined by a parallel execution image drawing system descriptive language and a structure network expanded from the element network.

The technique employing the structure network may be realized according to "A Language Processing System with an Object Network" disclosed in Japanese Unexamined Patent Publication (Kokai) No. 5-233690 of these applicants.

The structure network provides element images prepared by the element network with context and the feel of material and real existence. The structure network also carries out a dynamic image process. The structure network carries out this process for a user with no program. A dynamic image at a given main time point is considered to be a still image, which is plotted. The data of the still image is transferred to the dynamic image unit, which generates a dynamic image. The structure network automatically defines the positional relationship of the element images and plots the still and dynamic images. The structure network is capable of simultaneously carrying out the integration of a plurality of still images, the plotting of still images, and the plotting of dynamic images.

The element network plots element images that are not dependent on environments. On the other hand, the structure network mainly processes the environment dependent matters such as light, light sources, reflection, refraction, and material of an object. The structure network carries out such a process with reference to the element network, if necessary.

The still image structure network defines positional relationships among the plotted element images on the structure canvas. The still image structure network provides the element images with the positional relationships and context, and, according to the relationship among the element images, processes reflection, refraction, and shading. Each noun object class is indicated by a node. The nodes are connected to one another through directional branches. These branches are functions and verb objects. The REFINED COMPONENTS shown in FIG. 24 is a noun object, while the REFINE is a verb object.

Light is reflected by an interface of a medium according to a law of reflection, and is refracted according to a law of refraction. When light reaches the interface of the medium, part of the light is reflected toward the atmosphere, and the remnant is refracted to pass the interface and enter the medium.

Figure 25:
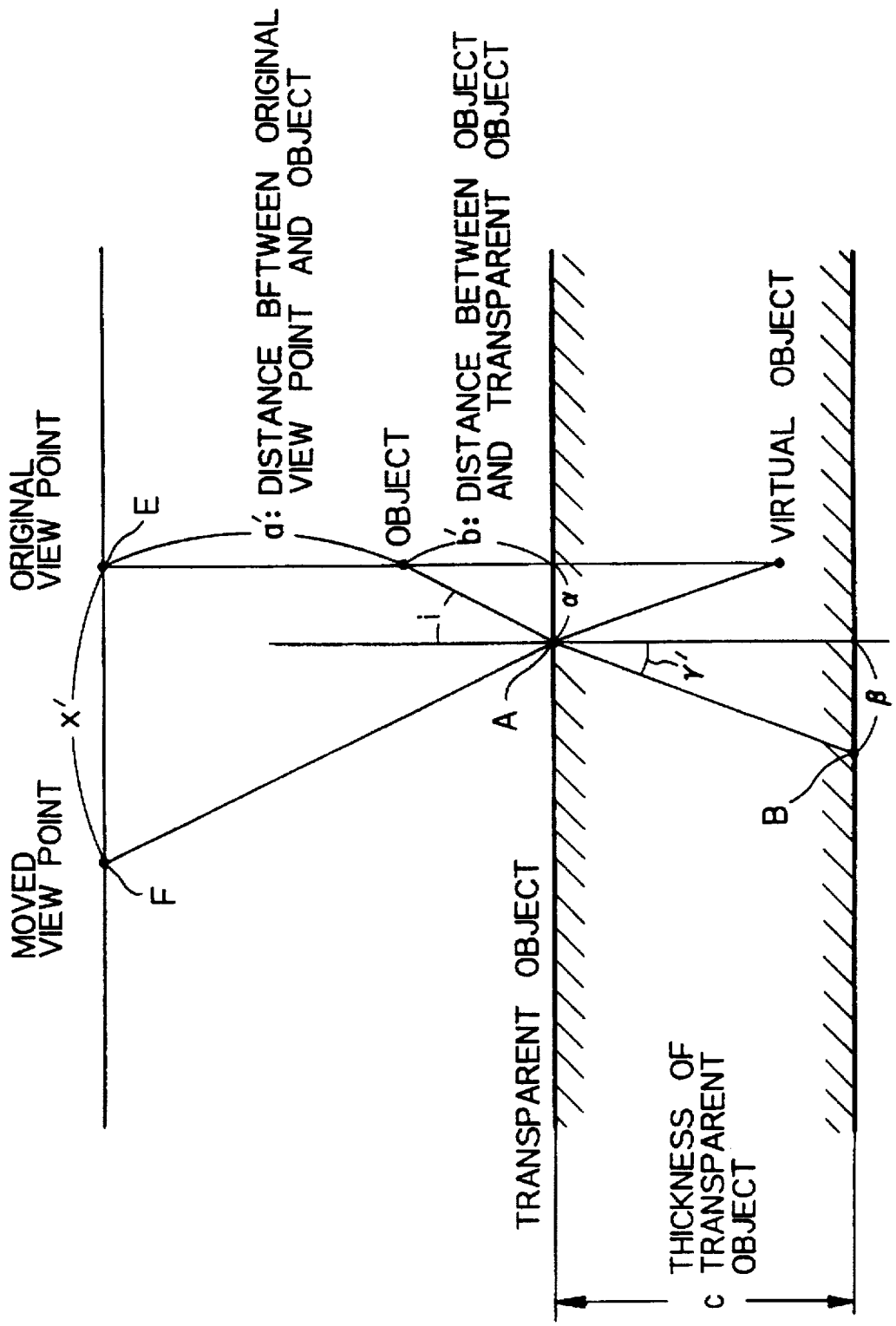
FIG. 25 is a diagram for explaining the positional relationship due to reflection and refraction.

FIG. 25 explains the positional relationship of the reflection and refraction. A transparent object has a thickness of c. When a view point is shifted by x', the surface of the transparent object provides a primary reflection point A and the bottom of the transparent object provides a secondary reflection point B. Then, the following is established:

$$\alpha = b'x'/(2b+a)$$

$$\beta = cx' \tan \gamma'$$

where a' is a distance between an original view point and an object, b' is a distance between the object and the transparent object, c is the thickness of the transparent object, x' is the length of the shift of the view point, and i and γ' are angles which will be hereinafter described.

After the relative position of the reflected image is defined, main point data is shifted to the position, to find a reflectance (dependent on the material) with respect to an incident angel. The luminance and chromaticity of the main point are calculated and the Helmholtz interpolation is carried out to generate the reflected image of the object.

The incident angle and the reflectance of the transparent object are given as follows:

when light diagonally propagates incident to an interface, reflected light is divided into "s" polarization and "p" polarization, depending on the polarization of the incident light.

$$\text{Reflection at a position } A = \left( \frac{na \cos i - nb \cos \gamma'}{na \cos i + nb \cos \gamma'} \right) \times$$

(Incident at a position A)

$$= (\gamma's) \times (\text{Incident at a position } A)$$

$$\text{Reflection at a position } A = -\left( \frac{\frac{\cos i}{na} - \frac{\cos \gamma'}{nb}}{\frac{\cos i}{na} + \frac{\cos \gamma'}{nb}} \right) \times$$

(Incident at a position A)

$$= (\gamma'p) \times (\text{Incident at a position } A)$$

where na is a refractive index on the incident side, nb is a refractive index on the refraction side, i is an incident angle, and γ' is a refractive angle. Each reflectance is as follows:

$$Rs = |rs|^2, \quad Rp = |rp|^2$$

Normal light involves the "s" and "p" polarizations at the same rate. Then, a reflectance R is as follows:

$$R = (Rs + Rp)/2$$

A reflected object is formed according to the luminance and chromaticity data of each main point entered by a user considering a reflectance, or it is formed according to a reflectance automatically calculated by the system according to the above relationship.

The shading is carried out as follows:
according to a view point of shading, light sources can be classified into two kinds. One is a coherent light source or a spot light source having no size. In this case, the boundary of a shadow is clear. Namely, the shadow is a complete shadow, which receives no direct light from the light source. Another is a linear light source or a surface light source having a length or an area. This sort of light source provides a shadow that gradually becomes lighter from a dense shadow, with no clear boundary. In this case, the shadow is made of a complete shadow and a half shadow. The half shadow is formed when direct light from the light source is partly blocked.

When a man shades a picture, he or she may set a main point for shading according to a main characteristic point of the picture, and according to the main point, shade and draw contours. Similarly, a color image processing and plotting system sets a main point in a given image, specifies a distance for shifting the point, and according to the main point, plots the contour of a shaded polygon. According to the number of specified main points, a light source is determined. The size of environmental light used for preparing the shaded polygon determines the complete shadow. The shadows prepared are integrated.

To form the shaded polygon, images are changed according to a combination of shearing, scaling, and translation.

In the dynamic image processing shown in the right half of FIG. 24, the POSITIONED COMPONENT receives a selected individual object. The INSTANCED COMPONENT specifies each objective point on the individual object.

The INSTANCED COMPONENT IN TIME SEGMENT relates the objective points to one another in time series. The INSTANCED COMPONENT IN TIME smooths the related data, and transfers the data to the still image processing side.

If a resultant image plotted in FIG. 24 is unsatisfactory, an output of the soft deformable motion velocity vector plot unit 4 is fed back to the motional velocity vector extract unit 210, to repeat the correction process.

As explained above, the present invention improves the techniques of extracting edges out of a color image disclosed in the preceding applications. The present invention extracts parameters for the rigid motion of each objective point on an individual object as well as the soft deformable motion of the objective point. The parameters are used to analyze and/or plot a dynamic image. The present invention greatly simplifies a process of confirming corresponding points between images before and after a motion, as well as a process of plotting the images. The present invention also deals with rotation around an in-plane axis.

We claim:

1. A computer-implemented dynamic image processor for temporally analyzing motion of each individual object contained in a given dynamic image, extracting motional data for one of said each individual object, storing the motional data, and/or plotting the motion of the individual object in the dynamic image according to the stored motional data, comprising a motional velocity vector extract unit for extracting a velocity vector out of the motion of the individual object, the unit having:

a rigid motion velocity vector extract unit for providing velocity vector data for rigid motion of the individual object including at least one of translation, scaling including at least one of enlargement and contraction, and rotation around an in-plane perpendicular axis; and a soft deformable motion velocity vector extract unit for providing velocity vector data for soft deformable motion of the individual object after subtracting rigid motion components of the rigid motion, the rigid motion velocity vector extract unit carrying out an affine transformation on the individual object, to provide the motional velocity vector data for the translation, scaling and in-plane perpendicular axis rotation of the individual object, and the soft deformable motion velocity vector extract unit calculating the motion of the individual object after subtracting the rigid motion components according to a vector technique, to provide the soft deformable motion velocity vector data;

wherein the rigid motion velocity vector extract unit provides the motional velocity vector data for the translation, scaling, and in-plane perpendicular axis rotation of the individual object by calculating an effective motional velocity vector of each objective point on the individual object as a function of a translation velocity vector, a scaling parameter, an angular velocity of the in-plane perpendicular axis rotation, and a distance vector between the objective point and a temporary center temporarily set for the scaling and in-plane perpendicular axis rotation, a normal component of the effective motional velocity vector and a tangent component of the effective motional velocity vector are measured at each of at least four points corresponding to the objective points on a segment forming the individual object, and the translation velocity vector, scaling parameter, and angular velocity of the in-plane perpendicular axis rotation are calculated according to the normal and tangents components.

2. A computer-implemented dynamic image processor according to claim 1, wherein the processor checks whether a value of rank regarding simultaneous equations used to determine whether the four points are independent of each other, and which are set by selecting the four points, is smaller than "8", and to select another four points which allows the value of rank to become "8", in the case where the previously selected value is smaller than "8".

3. A computer-implemented dynamic image processor according to claim 1, wherein the soft deformable motion velocity vector extract unit calculates the motion of the individual object after subtracting the rigid motion components, by sequentially selecting the four points independent of each other and among the objective points on a contour line and vectorially processing the contour line based on a shape of the individual object and/or a structure extended contour line determined based on changes in luminance and chromaticity or light reflected from the individual object when the light is illuminated on the individual object, interpolates undetermined points on the contour line and/or structure extended contour line, and finds velocity vectors among the corresponding points, and if all four independent points are not formed in the above objective points, the objective points are changed one after another on the contour line.

4. A computer-implemented dynamic image processor according to claim 1, wherein the objective points employed by the rigid motion velocity vector extract unit are set on a contour line based on a shape of the individual object and/or a structure extended contour line determined based on changes in luminance and chromaticity or light reflected from the individual object when the light is illuminated on the individual object, and the four points are among the points set on the contour line and/or structure extended contour line.

5. A computer-implemented dynamic image processor according to claim 4, wherein a velocity vector corresponding to the motion of the individual object is determined by processing each objective point at sampling timing when the image greatly changes and by interpolating each space between two object points at the sampling timing.

6. A computer-implemented dynamic image processor according to claim 1, wherein at least one intersection point, which is a point that is an intersection between highlight lines at a given sampling time, and/or at least one inflection point, which is a point that is inflected at the given sampling point, on a contour line and/or a structure extended contour line are selected as the four points, which are set on the contour line that is given based on the segment defining the shape of the individual object, and/or which are set on the structure extended contour line that is given based on changes in luminance and chromaticity or light reflected from the individual object when the light is illuminated on the individual object.

7. A computer-implemented dynamic image processor according to claim 6, wherein some points other than the intersection point and/or the inflection point on the contour line and/or the structure extended contour line are selected as the four points.

8. A computer-implemented dynamic image processor according to claim 1, wherein:

the rigid motion velocity vector extract unit carries out a divergence operation and a rotation operation according to the translation velocity vector of a point specified on the individual object if the translation velocity vector is given, to provide rigid motion velocity vector data for rotation around an in-plane axis; and the soft deformable motion velocity vector extract unit provides soft deformable motion velocity vector data for the individual object by subtracting the rigid motion components including the translation, scaling, in-plane perpendicular axis rotation, and in-plane axis rotation components.

9. A computer-implemented dynamic image processor according to claim 8, wherein a rigid motion velocity vector extract unit is operative to examine reflected light which is reflected by the individual object when light is illuminated on the individual object, and to obtain a highlight line, for recognizing a three-dimensional shape of the individual object by examination of movement of the highlight line, which is formed by connecting together a plurality of points in each of which an intensity of the reflected light becomes a maximum, and to provide the rigid motion velocity vector data which corresponds to the in-plane axis rotation when the individual object is rotated around the in-plane axis.

10. A dynamic image processor for temporally analyzing motion of each individual object contained in a given dynamic image, extracting motional data for use of said each individual object, storing the motional data, and/or plotting the motion of the individual object in the dynamic image according to the stored motional data, comprising a motional velocity vector plot unit for plotting the individual object according to a motional velocity vector representing the motion of the individual object, the unit having:

a rigid motion velocity vector plot unit employing velocity vector data for rigid motion of the individual object including at least one of translation, scaling including at least one of enlargement and contraction, and rotation around an in-plane perpendicular axis; and a soft deformable motion velocity vector plot unit employing velocity vector data for soft deformable motion of the individual object after subtracting the rigid motion components of the rigid motion, wherein the rigid motion velocity vector plot unit repeats the employment of velocity vector data for the rigid motion of the individual object and the soft deformable motion velocity vector plot unit repeats the employment of velocity vector data for the soft deformable motion of the individual object;

wherein said dynamic image processor provides the motional velocity vector data for the translation, scaling, and in-plane perpendicular axis rotation of the individual object by calculating an effective motional velocity vector of each objective point on the individual object as a function of a translation velocity vector, a scaling parameter, an angular velocity of the in-plane perpendicular axis rotation, and a distance vector between the objective point and a temporary center temporarily set for the scaling and in-plane perpendicular axis rotation, measures a normal component of the effective motional velocity vector and a tangent component of the effective motional velocity vector at each of at least four points corresponding to the objective points on a segment forming the individual object, and calculates the translation velocity vector, scaling parameter, and angular velocity of the in-plane perpendicular axis rotation according to the normal and tangents components.

11. A dynamic image processor according to claim 10, wherein the rigid motion velocity vector plot unit plots the rigid motion involving in-plane axis rotation of the individual object according to the translation velocity vector of each point on the individual object when the translation velocity vector is given in advance.

12. A dynamic image processor according to claim 10, wherein the rigid motion velocity vector plot unit plots the rigid motion of the individual object according to a translation velocity vector, a scaling parameter, and an angular velocity of the in-plane perpendicular axis rotation.

13. A dynamic image processor according to claim 12, wherein the rigid motion velocity vector plot unit plots the rigid motion of the individual object according to data obtained for each objective point at sampling timing.

14. A dynamic image processor according to claim 13, wherein the motional velocity vector plot unit sets an area, determines luminance data and/or chromaticity data in the area, plots the rigid motion and the soft deformable motion in the individual object.

15. A dynamic image processor according to claim 10, wherein the motional velocity vector plot unit plots the individual object in a sub-window set in a display screen.

16. A dynamic image processor according to claim 10, wherein the motional velocity vector plot unit provides the plotted individual object with a reflected image, a refracted image, or a shaded image.

17. A dynamic image processor according to claim 10, wherein the motional velocity vector plot unit corrects the motion of the individual object that changes depending on a sampling timing, to provide smoothly moving continuous images.

18. A dynamic image processor according to claim 10, wherein the rigid motion velocity vector plot unit finds a translation velocity vector Vp(x, y) at the coordinates (x, y) of each objective point on the individual object, determines a segment that satisfies the following conditions:

div Vp(x, y)=0, or rot VP(x, y)=0, and finds rigid motion velocity vector data for the in-plane axis rotation according to the translation velocity vectors on the segment.

19. A dynamic image processor according to claim 18, wherein the rigid motion velocity vector plot unit determines a segment that satisfies the following conditions:

div Vp(x, y)=0, or rot VP(x, y)=0, obtains rigid motion velocity vector data for the in-plane axis rotation, and according to the rigid motion velocity vector data, measures a distance from the in-plane axis to a surface of the individual object in a depth direction.

20. A dynamic image processor according to claim 10, wherein said motional velocity vector plot unit sets an area, determines luminance data and/or chromaticity data in the area, and plots the rigid motion and the soft deformable motion in the individual object.

* * * * *

UNITED STATES PATENT AND TRADEMARK OFFICE
CERTIFICATE OF CORRECTION

PATENT NO. : 5,719,947  
DATED : February 17, 1998  
INVENTOR(S) : Enomoto et al.

It is certified that error appears in the above-identified patent and that said Letters Patent is hereby corrected as shown below:

Title page,
Item [56], References Cited, OTHER PUBLICATIONS, add the following:

--

Chaudhuri et al., "Motion Analysis of a Deformable Object Using Subset Correspondence," CONFERENCE PROCEEDINGS - IEEE PACIFIC RIM CONFERENCE ON COMMUNICATIONS, COMPUTERS AND SIGNAL PROCESSING, Victoria, BC, Canada, June 1-2, 1989, ISSN0893-4266, pages 297-300.

Chen et al., "Shape and Motion of Nonrigid Bodies," COMPUTER VISION, GRAPHICS, AND IMAGE PROCESSING, Vol. 36, Nos. 2-3, Nov.-Dec. 1986, Duluth, MN, pages 175-207.

Kambhamettu et al., "Point Correspondence Recovery in Non-rigid Motion," PROCEEDINGS - IEEE COMPUTER SOCIETY CONFERENCE ON COMPUTER VISION AND PATTERN RECOGNITION, June 15-18, 1992, Champaign, IL, pages 222-27.

--

Column 6,
Line 24, change "period r" to -- period $\tau$ --.

Column 11,
Line 2, change "e can be" to -- $\omega$ can be --.

Column 15,
Line 59, change "$V(\xi) = \omega q \cdot \partial \sin\Theta = Z \cdot \omega q$" to -- $V(\xi) = \omega q \cdot \zeta \sin\Theta = Z \cdot \omega q$ --.

Column 16,
Line 60, change "$(dr/d\Theta) = \tan\Theta$" to -- $\therefore (dr/d\Theta) = \tan\Theta$ --.

Signed and Sealed this

Twenty-third Day of March, 2004

JON W. DUDAS  
*Acting Director of the United States Patent and Trademark Office*